United States Patent
Mizuno

(10) Patent No.: US 7,639,572 B2
(45) Date of Patent: Dec. 29, 2009

(54) PLAYBACK APPARATUS

(75) Inventor: Takao Mizuno, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 218 days.

(21) Appl. No.: 11/982,778

(22) Filed: Nov. 5, 2007

(65) Prior Publication Data

US 2008/0109834 A1  May 8, 2008

(30) Foreign Application Priority Data

Nov. 6, 2006  (JP) .............................. 2006-300707

(51) Int. Cl.
*G11B 7/085* (2006.01)

(52) U.S. Cl. .............. 369/30.32; 369/47.27; 369/270.1; 720/619

(58) Field of Classification Search .............. 369/44.14, 369/44.32, 53.45, 47.27, 124.11, 223, 270.1, 369/275.2, 30.03, 30.27, 30.32, 30.31, 30.34; 704/270; 720/619, 601, 612; 360/71; 711/4, 711/100

See application file for complete search history.

(56) References Cited

U.S. PATENT DOCUMENTS 6,128,263 A * 10/2000 Fujii et al. ............... 369/47.27

7,362,666 B2 * 4/2008 Omori et al. ............. 369/44.14

FOREIGN PATENT DOCUMENTS

| JP | 11-066703 | 3/1999 |
| JP | 2002-015502 | 1/2002 |
| JP | 2002-216412 A | 8/2002 |

OTHER PUBLICATIONS

Japan Notice of the reason for refusal, dated Aug. 27, 2008.

* cited by examiner

*Primary Examiner*—Ali Neyzari
(74) *Attorney, Agent, or Firm*—Yokoi & Co., U.S.A., Inc.; Peter Ganjian

(57) ABSTRACT

Disclosed herein is a disc playback apparatus with a built-in disc drive which performs hand-close process. The control unit 60 has the A/D input port P which is given the voltage of the terminal of the loading motor 78, after voltage reduction by the dividing resistors R1 and R2. It acquires the voltage applied to the A/D input port P at intervals of 20 ms if the disc tray 10 is in its completely ejected state and compares the acquired voltage with a predefined threshold value. If the acquired voltage is lower than the predefined threshold value, it clears the count, and if the acquired voltage is higher than the predefined value, it increments the count. If the count over 5, the control unit 60 delivers control signals to the driver circuit 88, thereby driving the loading motor to retract the disc tray 10.

5 Claims, 14 Drawing Sheets

PLAYBACK APPARATUS

CROSS-REFERENCES TO RELATED APPLICATIONS

The present application is related to the Japanese Patent Application No. 2006-300707, filed Nov. 6, 2006, the entire disclosure of which is expressly incorporated by reference herein.

BACKGROUND OF THE INVENTION

1. Field of the Invention

The present invention relates to a playback apparatus.

2. Description of the Related Art

Any disc drive, such as DVD drive, is provided with a "hand-close" device which retracts a disc (or a disc tray) automatically upon detection of its insertion. This device is conventionally so designed as to detect the opening and closing of the disc tray by means of the tray-out switch (as disclosed in Japanese Patent Laid-open Nos. Hei-11-66703 and 2002-15502). Alternatively, it has a thread sensor to detect the amount of movement of a disc (or a disc tray). It also detects the manual insertion of a disc by means of binarized signals generated by a comparator from the counter-electromotive force of the disc loading motor.

Unfortunately, the conventional hand-close device mentioned above additionally needs such expensive parts as tray-out switch, thread sensor, and comparator.

BRIEF SUMMARY OF THE INVENTION

It is an object of the present invention to provide a playback apparatus with a built-in disc drive which performs hand-close process without requiring additional expensive parts.

The present invention discloses a playback apparatus capable of reading information recorded on a disc record medium, said playback apparatus having built therein a loading motor to eject the disc record medium to a predefined position outside the playback apparatus and retracts the disc record medium into a predefined position inside the playback apparatus, and also having a control Integrated Circuit (IC) that generates a first voltage to rotate the loading motor in the direction of retracting the disc record medium and that also generates a second voltage to rotate the loading motor in the direction of ejecting the disc record medium, the playback apparatus comprising: said control IC has an Analog to Digital (A/D) input port; a unit for detecting counter-electromotive force at the A/D input port, said counter-electromotive force having polarity opposite to that of the first voltage in the loading motor when the disc record medium is at the predefined position outside the apparatus, a unit for judging whether or not the counter-electromotive force exceeds a predefined threshold value; and a unit for retracting the disc record medium into the playback apparatus by controlling the loading motor when the unit for judging the counter-electromotive force judges that the counter-electromotive force has exceeded the predefined value.

The foregoing structure is characterized in that the IC has an A/D input port, a unit for detecting counter-electromotive force, a unit for judging counter-electromotive force, and a unit for retracting a disc. The unit for detecting counter-electromotive force detects at the A/D input port the counter-electromotive force (with a polarity opposite to that of the first voltage in the loading motor) when the disc is at a predefined position outside the system. The unit for judgment judges whether or not the counter-electromotive force exceeds a predefined threshold value and controls the loading motor so that it retracts the disc to a predefined position inside the system when it judges that the counter-electromotive force exceeds a predefined threshold value.

"Predefined position outside the system" is that position where the disc is ejected so that the user can take it out. In the case of playback apparatus of disc tray type, it means the position where the disc tray is entirely ejected. In the case of playback apparatus of slot-in type, it means the position where the disc rests after ejection. "Predefined position inside the system" is the position that permits information retrieval from the disc inside the system. In the case of playback apparatus of disc tray type, it means the position where the disc tray is entirely retracted. In the case of playback apparatus of slot-in type, it means the position where the disc is entirely retracted.

The first voltage and second voltage are opposite to each other in polarity. The counter-electromotive force is a voltage which is opposite in polarity to the first voltage to be applied to the loading motor when the disc is retracted; however, they are not necessarily equal in absolute value. In addition, it is not always necessary that the counter-electromotive force that enters the A/D input port be the counter-electromotive force itself that is generated by the loading motor. The counter-electromotive force generated by the loading motor may be reduced to an adequate voltage by a voltage reducing circuit before it is entered into the A/D input port. This voltage reduction may be accomplished by connecting the A/D input port to an adequate point of a voltage divider which divides the voltage generated by the loading motor.

Entering the counter-electromotive force into the A/D input port of the control IC makes it easier to establish the threshold value than the conventional structure (like a comparator which receives binarized values through a general-purpose port). Therefore, it becomes remarkably simple to establish the desired threshold value. This means that it becomes possible to easily eliminate individual differences among loading motors used in the playback apparatus and hence it becomes possible to design products more suitable for general-purpose uses. Moreover, the A/D input port attached to the control IC is less expensive than comparators.

Incidentally, for the loading motor to generate counter-electromotive force, the disc (or disc tray) should be pushed into the playback apparatus by the user. This process is called "hand-close process". Not all users are familiar with hand-close process. Some users may be surprised at the disc being retracted at the normal speed, or there may be quick-tempered users who feel that the normal speed is slow.

To meet such various users' requirements, an optional aspect of the present invention provides a playback system, wherein: the unit for judging the counter-electromotive force can use as the predefined threshold value the first threshold value and the second threshold value which is larger than the first threshold value, and the unit for retracting the disc record medium causes the loading motor to rotate at the first rotating speed when the counter-electromotive force is larger than the first threshold value and smaller than the second threshold value and also causes the loading motor to rotate at the second rotating speed, which is faster than the first rotating speed, when the counter-electromotive force is larger than the second threshold value.

The playback apparatus constructed in this way retracts a disc at two different speeds. The first rotating speed of the loading motor may be established as the normal speed and the second rotating speed of the loading motor may be established as the faster-than-normal speed. In this way it is possible to meet quick-tempered users' requirements. Conversely, the second rotating speed of the loading motor may be established as the normal speed and the first rotating speed of the loading motor may be established as the slower-than-normal speed. In this way it is possible to avoid surprising users who are unfamiliar with hand-close process.

An optional aspect of the present invention provides a playback system wherein: the unit for judging the counter-electromotive force acquires and sums the counter-electromotive force at predefined time intervals and judges whether or not the summed value exceeds the predefined threshold value. The time intervals for summation may range from milliseconds to tens of milliseconds in view of the duration over which the user continues pushing the disc tray.

The playback apparatus constructed in this way is friendly to those users who are unfamiliar with hand-close process. Even when such users push in a disc nervously, counter-electromotive force is summed during their push-in operation and, as soon as the summed value reaches a predefined threshold value, the disc retracting unit controls the loading motor so that it retracts the disc into the playback apparatus.

Unfortunately, there is the possibility that counter-electromotive force exceeding a threshold value is erratically detected. Such counter-electromotive force may result from noise or internal or external vibration (which would occur when movable parts in the system operate or when the desk or floor moves). To avoid such erratic detection, an optional aspect of the present invention provides a playback apparatus wherein: the unit for judging counter-electromotive force acquires counter-electromotive force at predefined timing and, when the thus acquired counter-electromotive force exceeds the predefined threshold value consecutively as many times as predefined, judges that the counter-electromotive force has exceeded the threshold value.

Counter-electromotive force due to vibration usually does not occur continuously. Thus, counter-electromotive force that occurs continuously is judged to be due to user's operation and counter-electromotive force that is detected consecutively only a few times (less than the predefined value) is judged to be due to vibration. The playback apparatus constructed in this way prevents erratic operation.

One aspect of the present invention provides a playback apparatus with a built-in disc drive capable of reading information recorded on a disc, the playback apparatus having disc tray to hold a disc thereon, a loading motor that ejects the disc tray to a predefined position outside the system and retracts the disc tray into a predefined position inside the system and also having a driver circuit that generates a first voltage to turn the loading motor in the direction of retracting the disc tray and a second voltage to turn the loading motor in the direction of ejecting the disc tray and a control Integrated Circuit (IC) to control the driver circuit, wherein the control IC has an Analog to Digital (A/D) input port which is given a portion of the voltage across the terminals of the loading motor after voltage reduction in a predefined ratio by a voltage divider, so that it acquires the voltage applied to the A/D input port at predefined time intervals, compares the thus acquired voltage with a threshold value, clears the count if the acquired value is smaller than the threshold value or increments the count if the acquired voltage is larger than the threshold value, judges whether or not the count is larger than a predefined value, issues control signals to the driver circuit if the count is larger than a predefined value, and supplies the first voltage to the loading motor.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character (s) present corresponding parts throughout.

DETAILED DESCRIPTION OF THE INVENTION

Figure 1:
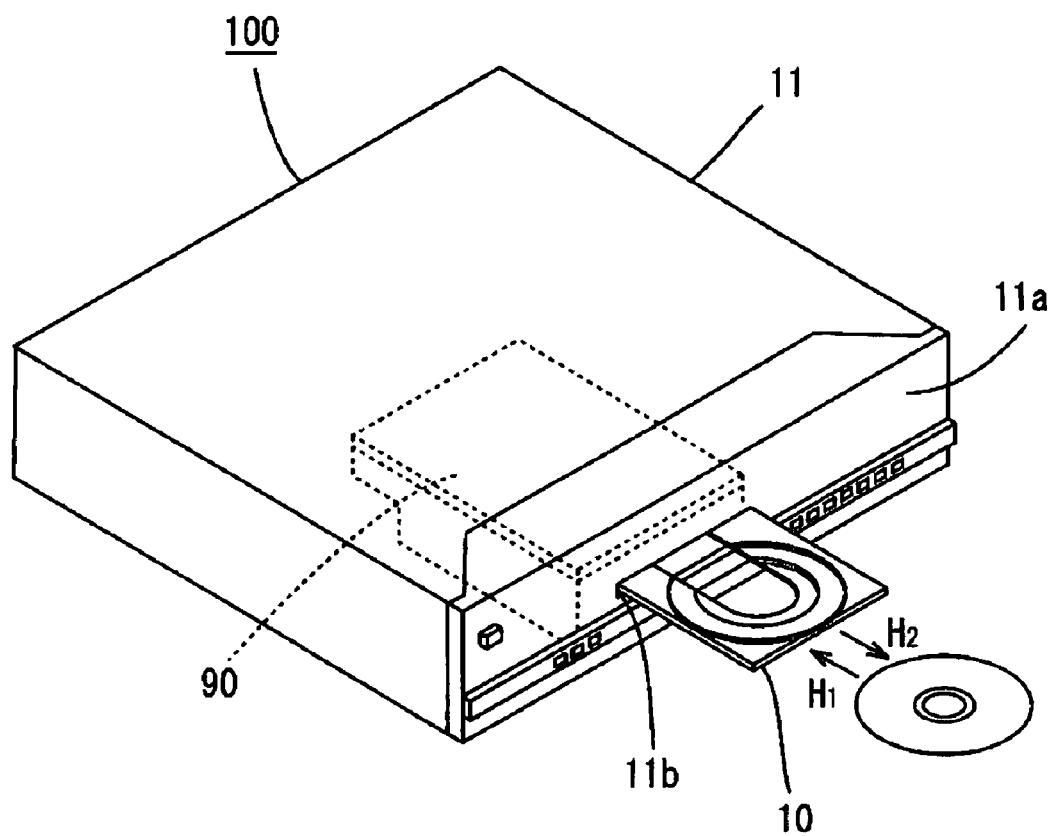
FIG. 1 is a perspective view showing the external appearance of a DVD playback apparatus as one of the embodiments of the present invention.

The detailed description set forth below in connection with the appended drawings is intended as a description of presently preferred embodiments of the invention and is not intended to represent the only forms in which the present invention may be constructed and or utilized.

For purposes of illustration, programs and other executable program components are illustrated herein as discrete blocks, although it is recognized that such programs and components may reside at various times in different storage components, and are executed by the data processor(s) of the computers.

What follows is a description of the embodiments of the present invention which is arranged in the following order.
(1) Construction of the DVD playback apparatus
(2) Construction of the loading motor
(3) Circuit to detect the counter electromotive force
(4) Procedure by the control unit
(5) Modified procedure by the control unit
(6) Summary

(1) Construction of the DVD Playback Apparatus

The DVD playback apparatus, as an embodiment of the disc playback apparatus according to the present invention, will be described below with reference to the accompanying drawings. Although the DVD playback apparatus represents the embodiment, it may be replaced by any playback apparatus for other optical discs such as CD. Such a system may have not only a playback function but also a recording function. It may also include an HDD (hard Disk Drive) reproducing and recording function, a reel tap reproducing and recording function (for VHS and beta), and any function for combo-type playback apparatus. Although the embodiment described below is a DVD playback apparatus of tray type, it may also include that of slot-in type.

FIG. 1 is a perspective view showing the external appearance of a DVD playback apparatus 100 as one of the embodiments of the present invention. The DVD playback apparatus 100 is contained in a cuboidal outer housing 11. In the outer housing 11 is placed a disc drive unit 90. In the front panel 11a of the outer housing 11 is formed a slit opening 11b through which the disc tray 10 (carrying an optical disc for the disc drive unit 90) is retracted or ejected.

Figure 2:
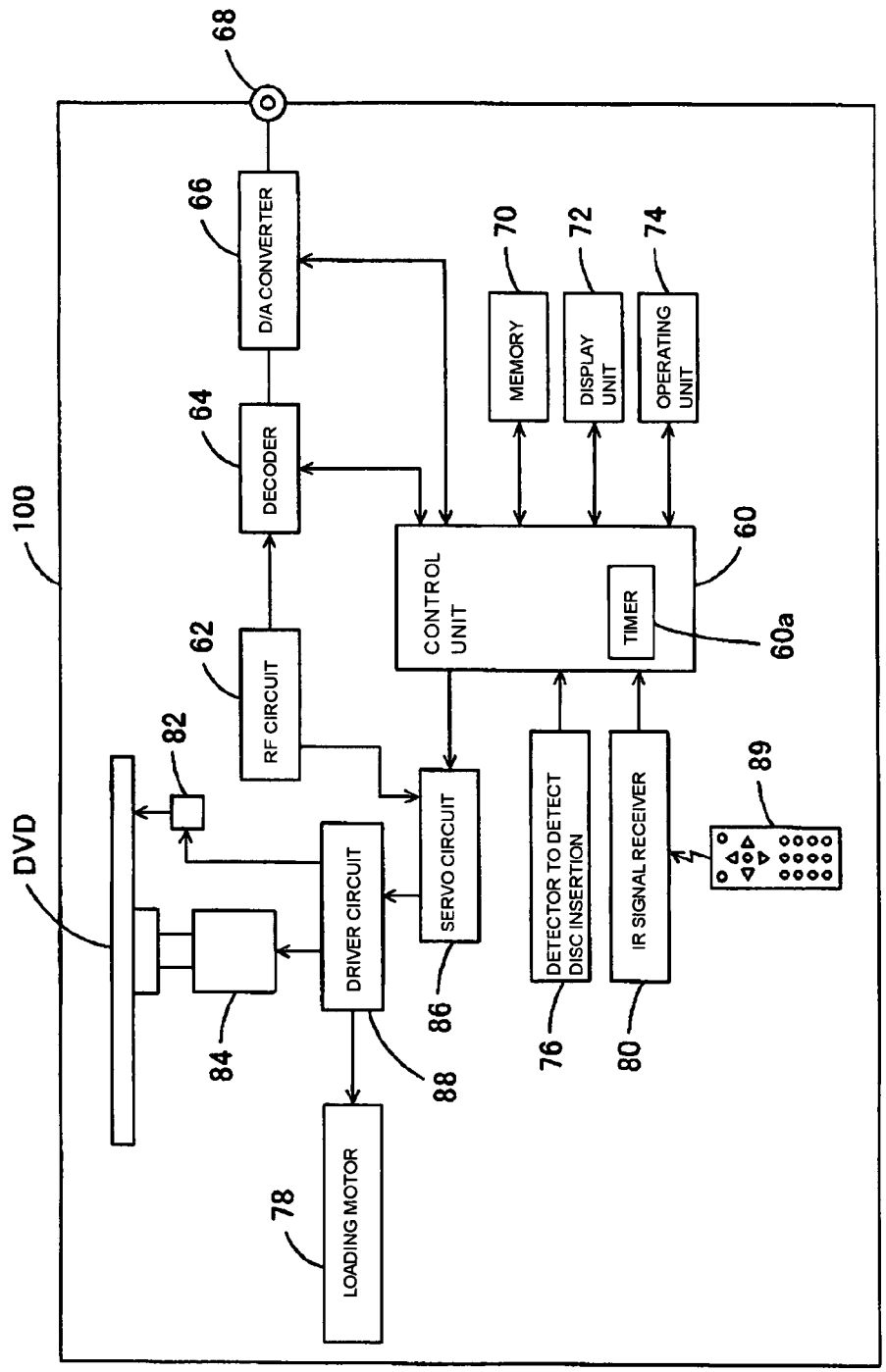
FIG. 2 is a block diagram showing the electrical structure of a DVD playback apparatus as one of the embodiments of the present invention.

FIG. 2 is a block diagram showing the electrical structure of the DVD playback apparatus 100 pertaining to the embodiment of the present invention. The DVD playback apparatus 100 reads and reproduces video/audio data recorded on an optical disc which is placed on the tray, and it outputs the reproduced video/audio data from an external output terminal. The output may be data itself or any other data than video/audio data. The DVD playback apparatus 100 possesses a function to retract or eject an optical disc (placed on the tray) together with the tray.

To be more specific, the DVD playback apparatus 100 is composed a control unit 60, an RF circuit 62, a decoder 64, a D/A converter 66, an external output terminal 68, a memory 70 storing set-up data, a display unit 72 to display messages, an operating unit 74 for the user to instruct the system to eject the tray, a detector 76 to detect disc insertion, a loading motor 78, an IR signal receiver 80 which receives IR signals transmitted from a remote control 89 and converts them into electrical signals for output, an optical pick-up (optical PU) 82, a spindle motor 84, and a remote control 89.

The control unit 60 has a terminal to receive control signals expressed in terms of voltage or current, and it controls the DVD playback apparatus 100 according to the received control signals. To be concrete, the control unit 60 is in the form of control IC having a plurality of terminals. This IC is composed of a CPU as well as ROMs and RAMs to store programs for execution of instructions. The CPU in the control unit 60 executes programs (stored in ROMs) while using RAMs as the work area, according to control signals entering through the terminals. At the same time, the CPU delivers control signals from output terminals so as to control the DVD playback apparatus 100 entirely. In addition, the control unit 60 also has a built-in timer 60a, so that the control process can be carried out at predefined timing in response to clock signals.

The optical PU 82 has an actuator, a laser diode, collimator lens, and photodetector (which are not shown). The actuator is a movable unit capable of carrying an object lens attached thereto. It moves the object lens in the focusing direction (the direction of the optical axis of the laser beam impinging on the optical disc) and also in the tracking direction (the radial direction of the optical disc).

The optical PU 82 directs the laser beam emerging from the laser diode to the optical disc through the collimator and object lens and receives the reflected light from the optical disc for conversion into electrical signals by the photodetector. The photodetector converts the received light in a specific region sensitive thereto into RF electrical signals and then sends them to the RF circuit 62. In other words, the optical PU 82 optically reads information stored in the optical disc and sends it out.

The RF circuit 62 binarizes RF signals from the optical PU 82 and then amplifies them and gives amplified signals to the decoder 64. The RF circuit 62 also generates focusing error (FE) signals and tracking error (TE) signals in response to signals from the optical PU 82 and then gives them to the servo circuit 86.

The decoder 64 performs decoding (such as data demodulation and error correction) on entered signals and gives data to the D/A converter 66. The decoder 64 also performs CD-ROM decoding and MPED decoding according to need to regenerate information read from the optical disc. The D/A converter 66 converts digital signals (from the decoder 64) into analog signals and gives the converted signals to the external output terminal 68.

The servo circuit 86 generates focusing driving signals which set the value of FE to 0 (standard level) and tracking driving signals which set the value of TE to 0 (standard level) in response to FE and TE from the RF circuit 62, and then it delivers such signals to the driver circuit 88. The servo circuit 86 also generates laser driving signals (which cause the optical PU 82 to emit laser beams at the time of playback) in response to instructions from the control unit 60, and then it delivers such signals to the optical PU 82. The servo circuit 86 also generates spindle motor driving signals (which set the number of revolutions of DVD to a predefined value) and delivers them to the driver circuit 88. The spindle motor driving signals are generated according to the signals delivered from the decoder 14.

The driver circuit 88 drives the actuator inside the optical PU 82 in response to the focusing driving signals and tracking driving signals. The actuator slightly moves the object lens mover in response to the focusing driving signals and tracking driving signals, and servo control is accomplished in this way. This process causes the laser beam from the object lens to follow the desired recording track on the optical disc and also causes the laser beam to focus on the recording track.

The driver circuit 88 also causes the turn table (which carries the optical disc thereon) to rotate at a predefined number of revolutions. The turn table rotates as the information recorded on the DVD is read in response to the spindle motor driving signals. To be concrete, the driver circuit 88 supplies a predefined driving voltage to the spindle motor 84 in response to control by the control unit 60, so that the turn table connected to the spindle motor 84 rotates.

Moreover, the driver circuit 88 supplies a predefined voltage to the loading motor 78 in response to control by the control unit 60, thereby causing the disc tray 10 to be retracted or ejected. When the operating unit 74 instructs tray ejection, the control unit 60 receives control signals for tray ejection. Upon receipt of control signals, the control unit 60 applies a predefined voltage V1 (the second voltage) to the loading motor 78 for a predefined period of time. The second voltage thus applied causes the loading motor 78 to rotate as many times as predefined for tray ejection. On the other hand, when the operating unit 74 instructs the tray to be retracted or when the hand close process (mentioned later) is done, the control unit 60 receives signals for tray retracting. Upon receipt of these signals, the control unit 60 applies a voltage V2 (the second voltage), which has a polarity opposite to that of V1, to the loading motor 78 for a predefined period of time. Application of the first voltage causes the loading motor 78 to rotate as many times as predefined, so that the tray is retracted. As mentioned above, the loading motor 78 carries (or draws in) the tray from the outside of the playback apparatus into the inside of the playback apparatus and also carries (or ejects) the tray from the inside of the playback apparatus into the outside of the playback apparatus.

The disc insertion detector 76 detects whether or not an optical disc is placed on the tray which has been retracted from the playback apparatus.

(2) Construction of the Loading Motor

Figure 3:
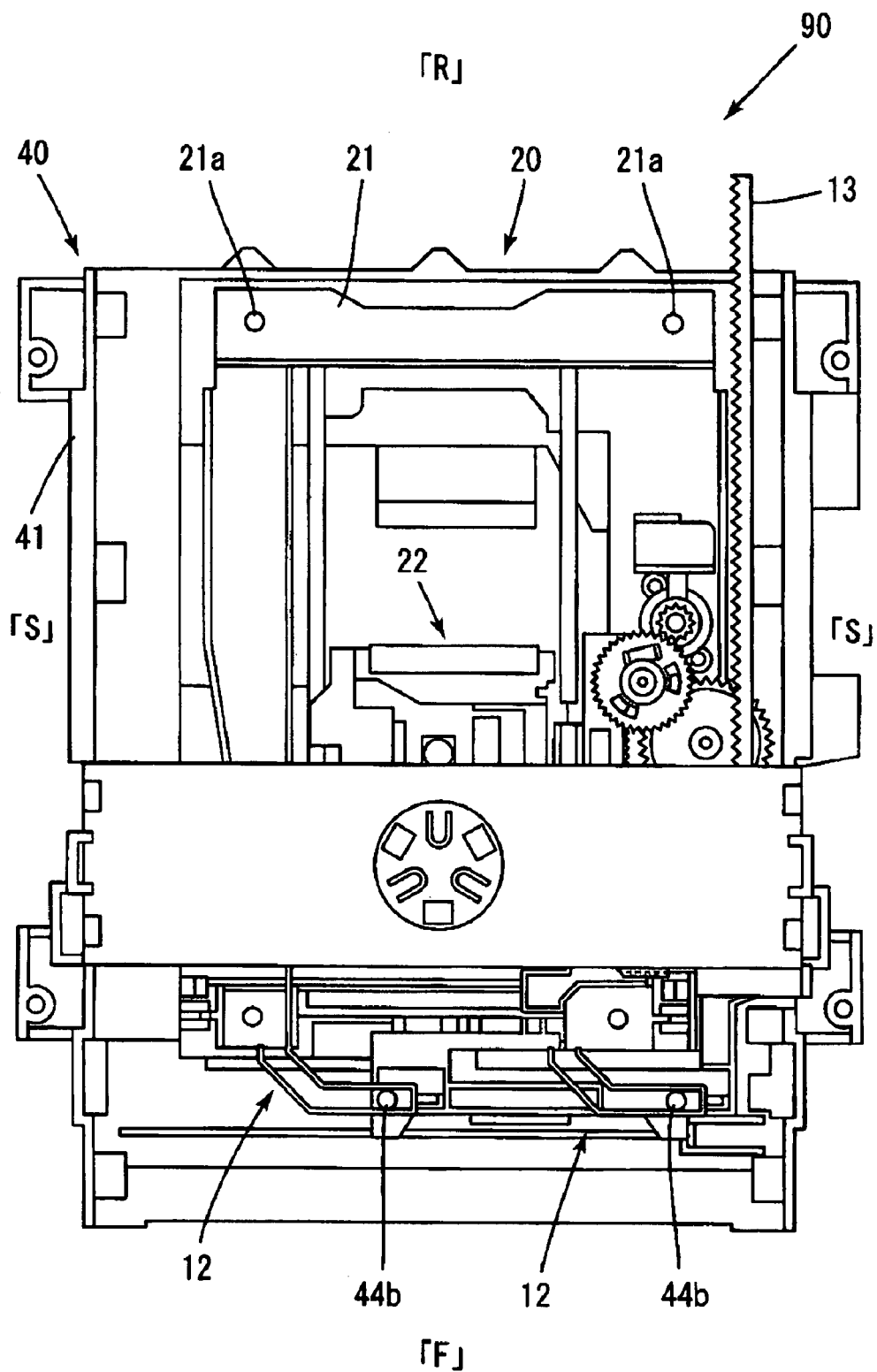
FIG. 3 is a schematic top view showing the internal structure of a disc drive unit.
Figure 4:
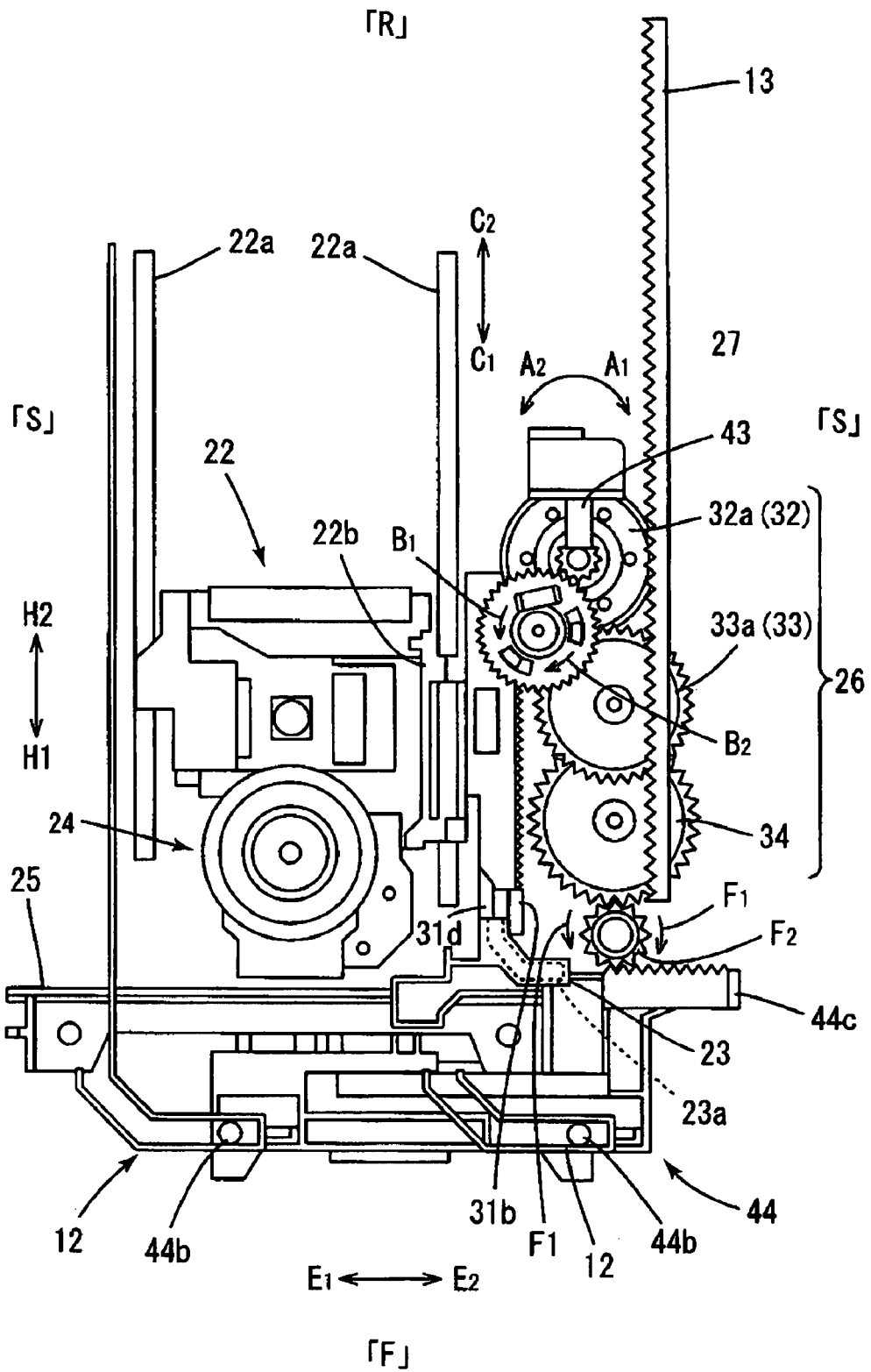
FIG. 4 is a schematic diagram showing the internal structure of the disc drive unit shown in FIG. 3, with the loader chassis (mentioned later) omitted.
Figure 5:
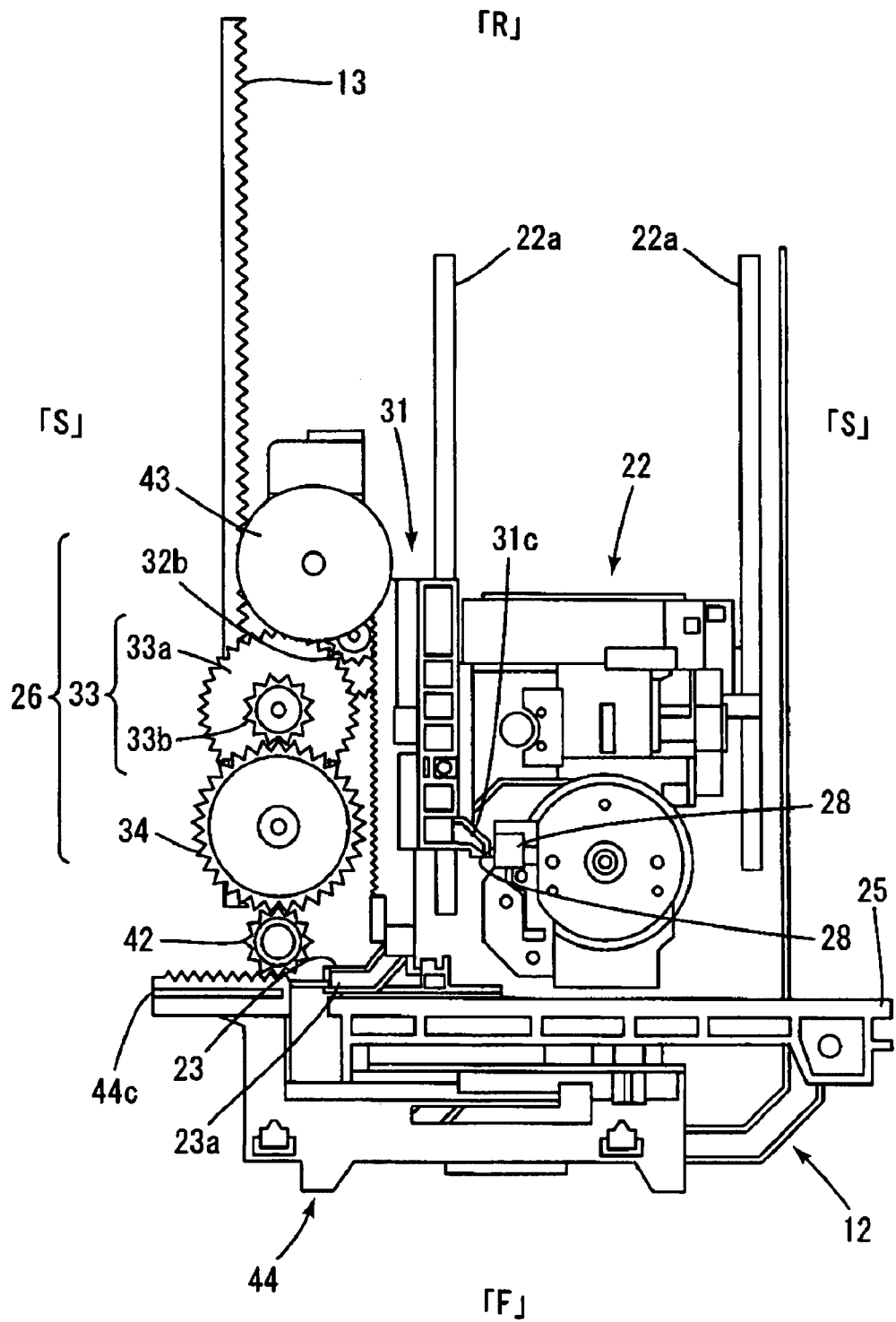
FIG. 5 is a schematic bottom view showing the internal structure of the disc drive unit.
Figure 6:
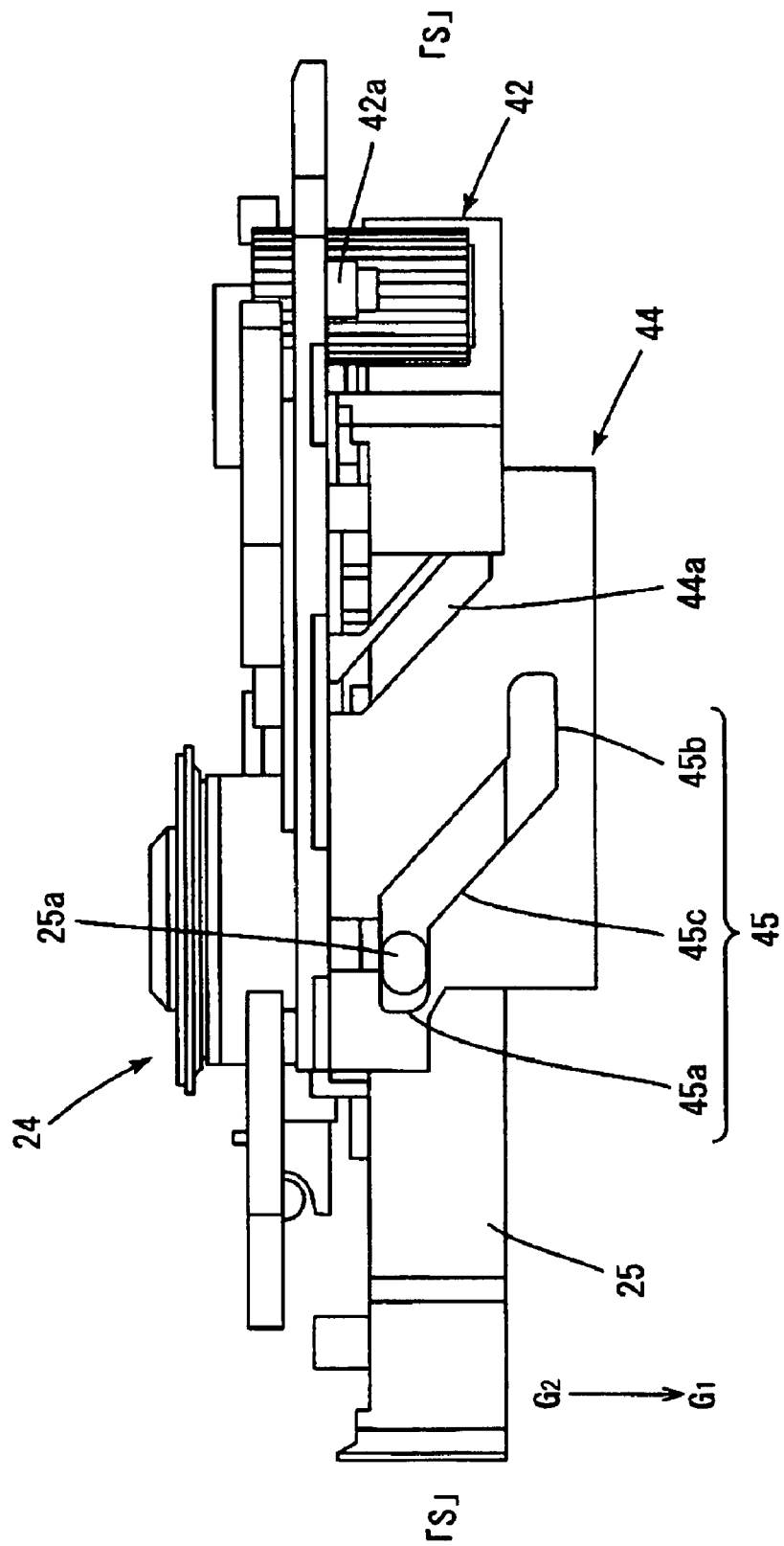
FIG. 6 is a schematic diagram (as viewed from the front panel) showing the internal structure of the disc drive unit.
Figure 7:
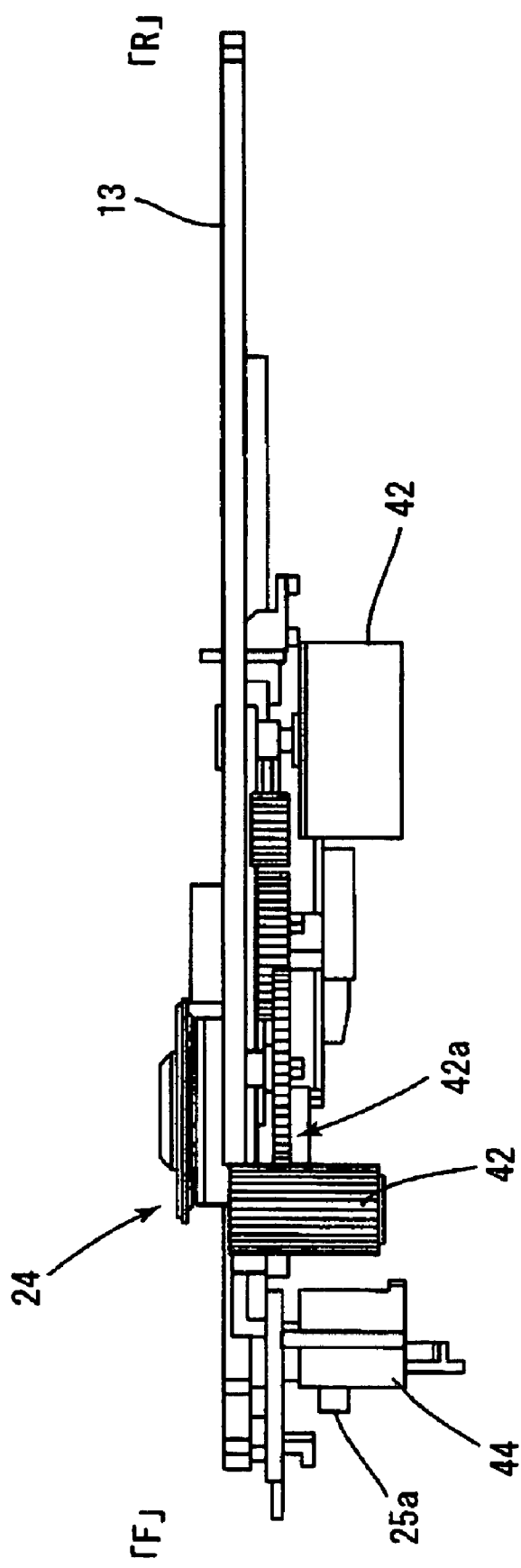
FIG. 7 is a schematic diagram (as viewed from the side) showing the internal structure of the disc drive unit.

FIGS. 3 to 7 show the construction of the disc drive unit 90 according to the present invention. FIG. 3 is a schematic top view showing the internal structure of a disc drive unit 90. FIG. 4 is a schematic diagram showing the internal structure of the disc drive unit 90 shown in FIG. 3, with the loader chassis (mentioned later) omitted. FIG. 5 is a schematic bottom view showing the internal structure of the disc drive unit 90. FIG. 6 is a schematic diagram (as viewed from the front panel) showing the internal structure of the disc drive unit 90. FIG. 7 is a schematic diagram (as viewed from the side) showing the internal structure of the disc drive unit 90. For the sake of convenience, FIGS. 4 to 7 do not show the disc tray 10 but show only the tray groove 12 and the tray track 13.

The disc drive unit 90 has a disc tray 10, a traverse assembly unit (TAU) 20, and a loader chassis unit (LCU) 40.

The disc tray 10, shown in FIG. 1, is intended to hold a disc thereon. It is retracted and ejected through the slit opening 11b formed in the front panel 11a of the outer housing 11. For such reciprocating movement, the disc tray 10 is provided with the tray grooves 12 and 12 and the tray rack 13, as shown in FIG. 3. The tray groove 12 assumes an "L" shape, with its corner formed stepwise. The tray rack 13 extends in the lengthwise direction of the disc tray 10 so that it is driven by the gear tray 42 (mentioned later). The tray grooves 12 and 12 are placed such that the longer part of "L" is parallel to the longer part of the disc tray and the shorter part of "L" is parallel to the shorter part of the disc tray. Incidentally, the following rule applies to what is mentioned below. That side in which the front panel 11a is formed is expressed as the front side ("F"). That side opposite to the front side is expressed as the rear side ("R"). That side which is perpendicular to the direction extending from the front side to the rib side is expressed as sideway side ("S").

The traverse assembly unit (TAU) 20, shown in FIGS. 3 to 5, includes a traverse assembly (TA) 21, an optical pickup unit (OPU) 22, a lever trigger 23, a spindle motor 24, a traverse holder 25, a group of gears for driving power transmission (gears) 26, a transmission type sensor (encoder sensor) 27, and a contact sensor 28 to detect whether or not the inner circumference has been reached.

The traverse assembly 21 is a frame on which are mounted the OPU 22, the lever trigger 23, the spindle motor 24, the traverse holder 25, the gear groups 26 (to transmit driving power), the transmitting sensor (encoder sensor) 27, and the contact sensor 28. It is screwed to one end of the rear side of the loader chassis (mentioned later).

The OPU 22 directs a laser beam to the disc, thereby recording or reproducing signals. It is fixed to the OPU base 22b which is movably mounted on the shafts 22a and 22a attached to the traverse assembly. To be concrete, it is composed of a semiconductor laser to emit a laser beam, an object lens to condense the laser beam onto the recording surface of the disc, and a light receiving element to receive the laser beam reflected by the disc.

Incidentally, the OPU base 22b is provided with the OPU rack 31 which receives the driving power from the drive motor 43 (mentioned later). The OPU rack 31 has the main rack 31a on its lower part and the subrack 31b on its upper part. The main rack 31a transmits driving power to move the OPU 22 (or OPU base 22b), and the subrack 31b eliminates backlash between the first OPU pinion 32b and the main rack 31a by means of a coil spring.

In other words, the OPU rack 31 is a double rack composed of the main rack 31a and the subrack 31b. They are placed on top of the other in such a way that the teeth of the subrack 31b extend to the rear side more than the teeth of the main rack 31a. Consequently, there will be two cases: in one case the first OPU pinion 32b engages with the main rack 31a and subrack 31b, and in the other case the first OPU pinion 32 engages with the subrack 31b.

Incidentally, the main rack 31a has a projection 31c at its forward end (close to the front side). This projection 31c pushes (or turns on) the switch 28a of the contact sensor 28. The subrack 31b has the OPU rack boss (first boss) 31d at is forward end. The OPU rack boss 31d projects so that it engages with the bent groove 23a of the lever trigger 23 (mentioned later). The OPU 22 moves in the same direction as the disc tray 10 (reciprocating movement between the front side and the rear side).

The lever trigger 23 has the bent groove (the first groove) 23a, which engages with the OPU rack boss 31d, and the connecting boss (not shown) which fits into the connecting groove 44a of the cam slider 44 (mentioned later). The OPU rack boss 31d (engaging with the bent groove 23a) causes, depending on its position (or movement), the first OPU pinion 32b to engage with or not to engage with the teeth of the OPU rack 31 (main rack 31a and subrack 31b). In addition, the lever trigger 23 is attached to the traverse assembly 21 such that it reciprocates in the sideway direction (perpendicular to the direction in which the disc tray moves) according to the position (movement) of the OPU rack boss 31d fitting in the bent groove 23a.

The spindle motor 24 rotates the chucked disc. Chucking (for disc playback) takes place as the TAU 20 mounted on the spindle motor 24 moves up and down (as mentioned later).

The traverse holder 25 is a power transmitting member which is fixed to the front side of the traverse assembly 21. To be concrete, it has the boss (T boss or the second boss) 25a which engages with the cam groove 45 (mentioned later) of the cam slider 44, so that it moves the traverse assembly 21 (TAU 20) up and down as the cam slider 44 moves.

The driving power transmission gears 26 includes those gears which transmit driving power to the OPU 22 (for its reciprocating motion) from the drive motor (DC motor) mounted on the loader chassis unit (LCU) 40, and it also includes those gears which transmit driving power to move the cam slider 44. To be concrete, the first gear OPU 32, the second gear OPU 33, and the gear drive 34 are pivotally supported on the driver assembly 21.

The first gear OPU 32 is comprised of the large gear 32a and the pinion gear 32b. The former receives driving power from the drive motor 43 (mentioned later), and the latter transmits driving power to the OPU rack 31. The latter is mounted on the lower side (close to the LCU 40) of the large gear 32a at its center. In other words, the large gear 32a is placed in the upper position and the small gear 32b is placed in the lower position, and they are supported pivotally and coaxially.

The second gear OPU 33 is comprised of the large gear 33a and the pinion gear 33b. The former receives driving power from the pinion 32b of the first gear OPU mentioned above, and the latter transmits driving power to the gear drive 34. The latter is mounted on the lower side (close to the LCU 40) of the large gear 33a at its center. In other words, the large gear 33a is placed in the upper position and the small gear 33b is placed in the lower position, and they are supported pivotally and coaxially.

The gear drive 34 receives driving power from the small gear 33b of the second gear OPU; it is pivotally supported on the traverse assembly 21.

Figure 8:
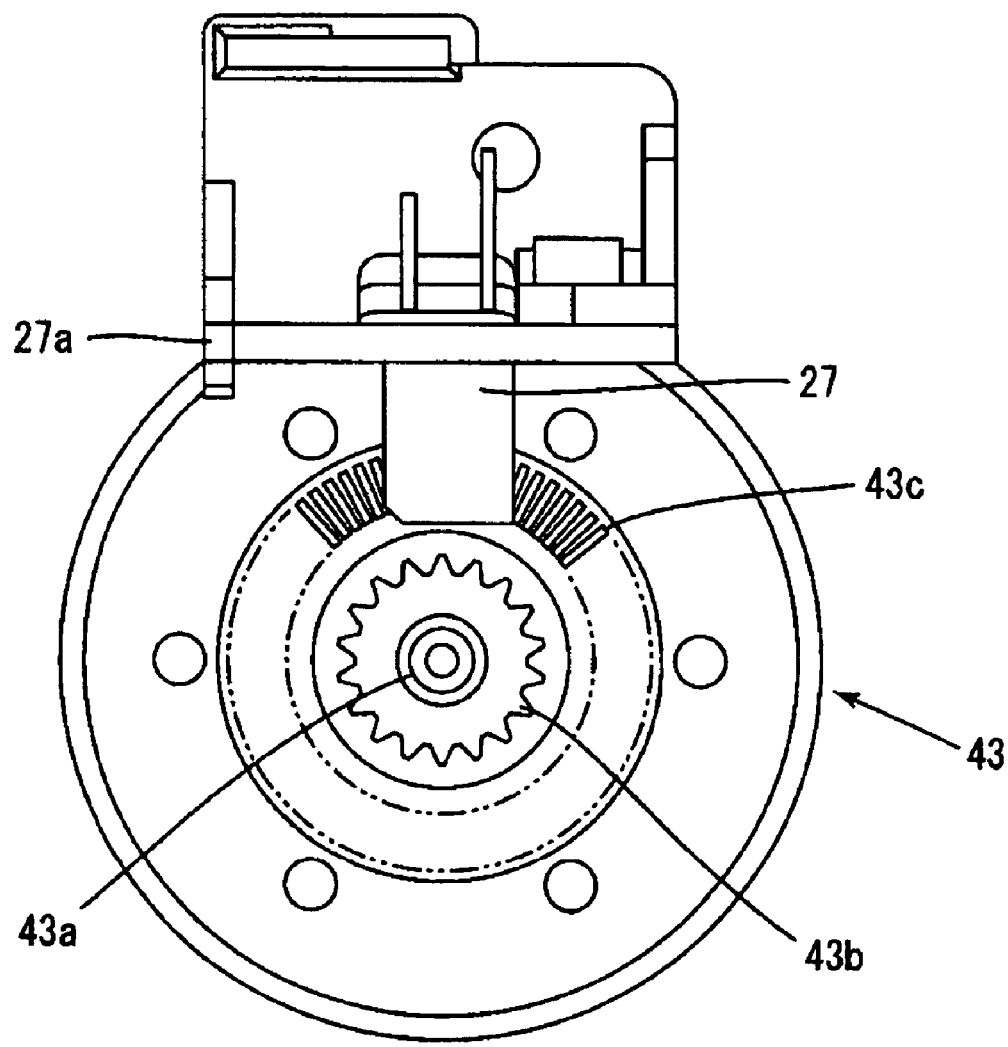
FIG. 8 is a schematic top view showing the structure of transmission sensor, drive motor, pinion gear, and strip plate.
Figure 9:
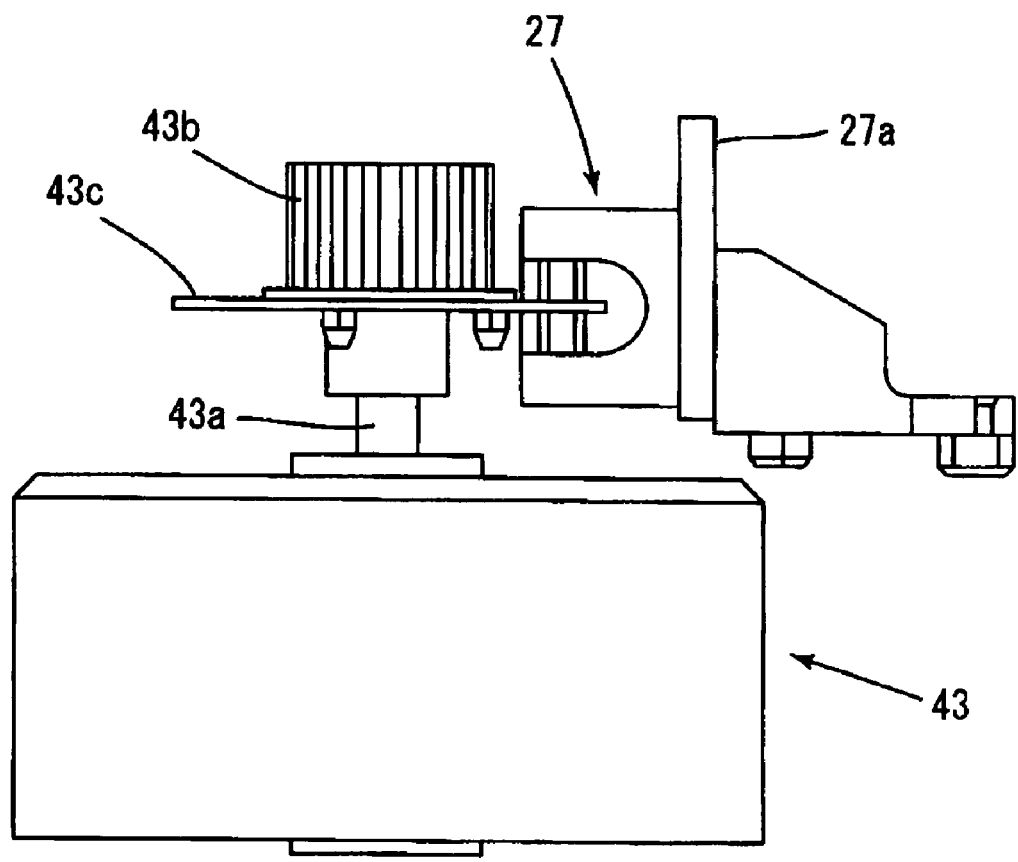
FIG. 9 is a schematic side view showing the structure of transmission sensor, drive motor, pinion gear, and strip plate.

The transmitting sensor (optical sensor) 27 reads slits in the slit plate 43c mounted on the output axis of the driving motor 43. The reading of slits gives signals for detecting the position corresponding to rotation of the pinion gear 43b mounted on the output axis 43a. To be concrete, the transmitting sensor 27, shown in FIGS. 8 and 9, is mounted on the printed board 27a attached to the traverse assembly 21. It has a C-shaped longitudinal cross section. At one end of the C shape is a light-emitting element, and at the other end of the C shape is a light receiving element.

Between the two ends lies the slit plate 43c. The slit plate 43c causes the light receiving element to receive light from the light-emitting element intermittently as it rotates. The light received functions as signals to detect the rotating position of the pinion gear 43b.

As shown in FIG. 5, the contact sensor 28 is a sensor mounted on the rear side (facing the loader chassis 41) of the traverse assembly 21. It has a switch 28a, which becomes ON, when it comes into contact with the projection 31c on the main rack 31a. Incidentally, the disc drive unit 90 according to the present invention performs encoding control by means of the contact sensor 28, which becomes ON and OFF, and the position detecting signals (mentioned above). A detailed description of encoding control will follow.

The loader chassis unit (LCU) 40, shown in FIG. 5, includes the loader chassis (main body chassis) 41, the gear tray 42, the driving motor (sled motor) 43, and the cam slider 44.

The loader chassis 41 is the main body chassis to accommodate the TAU 20. It has mounted thereon the driving motor 43 and the cam slider 44.

The gear tray 42 is a gear which receives driving power from the gear drive 34, and it is pivotally supported on the loader chassis 41. Incidentally, the gear tray 42 is partly lacking (intermittent part 42a) in the axial direction, so that it engages with the gear drive 34 intermittently.

The driving motor 43 functions as a power source to open and close the disc tray 10, to reciprocate the OPU 22, and to reciprocate the cam slider 44 (or to move up and down the TAU 20). It has the output axle 43a into which the pinion gear 43b is fitted. In addition, it has a disk plate (slit plate 43c) having slits on the surface perpendicular to the output axle 43a.

The cam slider 44 includes the linking groove 44a (which engages with the linking boss (not shown) of the lever trigger 23), the projecting bosses 44b and 44b (which engage with the tray grooves 12 and 12 of the disc tray 10), the cam groove 45 (which engages with the T-boss 25a of the traverse holder 25) (see FIG. 3), and the slider rack 44c (which engages with the gear tray 42).

The cam slider 44 is fitted into the groove rail (not shown) formed in the direction perpendicular to the direction in which the disc tray 10 moves on the plane of the front side of the loader chassis 41, so that it reciprocates along the groove rail.

Incidentally, the cam groove 45, with the cam slider 44 fitted into the groove rail, is composed of two open grooves 45a and 45b (the upper open groove 45a and the lower open groove 45b), which constitute the horizontal slits in the upper and lower sides (both sides) in the vertical direction, and the aslant open groove 45c, which connects them with one another. (See FIG. 3.) This cam groove 45 has the T-boss 25a of the traverse holder 25 inserted therein. Thus, when the cam slider 44 moves such that the T-boss 25a is positioned at the upper open groove 45a, the traverse holder 25 rises, and when the cam slider 44 moves such that the T-boss 25a is positioned at the lower open groove 45b, the traverse holder 25 lowers.

The members (OPU 22, TAU 20, and disc tray 10) move (or work) in the following way. First, the OPU 22 of the disc drive unit 90 according to the present invention moves as follows. Completing playback of a disc (such as DVD), the user pushes the open/close button on the external housing 11 to take out the disc from the disc drive unit 90 (or to cause the disc drive unit 90 to eject the disc tray 10).

Then, the driving motor 43 turns in the direction A1 (positive rotational direction), and as the result, the pinion gear 43b also turns in the direction A1. Thus, the first gear OPU large gear 32a (or the first gear OPU 32), which engages with the pinion gear 43b, turns in the direction B1. Consequently, the first gear OPU small gear 32b, which meshes with the first gear OPU large gear 32a, also turns in the direction B1, and the OPU rack 31 (main rack 31a and subrack 31b), which meshes with the first gear OPU small gear 32b, moves in the direction C1. And, the OPU base 22b, which is attached to the OPU rack 31, also moves and the OPU 22 moves in the direction C1 (in the inwardly radial direction of the disc).

Incidentally, the first OPU small gear 32b and the second gear OPU large gear 33a are in mesh with each other at all times and the second gear OPU small gear 33b and the gear drive 34 are in mesh with each other at all times; therefore, the second gear OPU small bear 33b (the second gear OPU) and the gear drive 34 receive driving power from the drive motor 43 at all times. However, while the OPU 22 is moving, the gear drive 34 is positioned at the lacking part 42a of the gear tray 42. Therefore, the driving power is not transmitted to the gear tray 42 through the gear drive 34 and hence the TAU 20 and the disc tray 10 do not move.

As mentioned above, after the OPU 22 has reached the position inside the disc, the drive motor 43 continues to rotate. Thus, only the subrack 31b extending toward the rear side from the main rack 31a and subrack 31b meshing with the first gear OPU small gear 32b meshes with the first gear OPU small gear 32b.

Then, the subrack 31b moves further inward. Thus, the OPU rack boss 31d formed on the subrack 31b fits into the bent groove 23a of the lever trigger 23 and moves in the direction C1. With the subrack 31b moving in the direction C1, the lever trigger 23 moves in the direction D1. Then, the OPU rack boss 31d becomes engaged (locked) with the end of the bent groove 23a. This results in disengagement between the main rack 31a and the first gear OPU small gear 32b, and the OPU 22 comes to rest at a position inside the disc.

On the other hand, the lever trigger 23, which moves in the direction of D1 in linkage with the movement of the subrack 31b, has a connecting boss which fits into the connecting groove 44a of the cam slider 44. Therefore, the cam slider 44 slightly moves (slides) in the direction of E1 in linkage with the movement of the lever trigger 23. As the result, the cam slider rack 44c of the cam slider 44 also moves in the direction of E1.

As the cam slider rack 44c moves in the direction of E1, the gear tray 42 meshing with this cam slider 44c rotates in the direction F1. As the result, the intermittent part 42a on the gear train 42 changes in position (see FIGS. 3 and 4) and engagement occurs between the gear drive 34 and the gear tray 42.

This engagement causes the driving power of the drive motor 43 to be transmitted to the cam slider rack 44c and then the cam slider 44 through the gear tray 42.

Thus, the cam slider 44 is made to move further in the direction E1 by the driving power of the drive motor 43. The cam groove 45 of the cam slider 44 has fitted therein the T-boss 25a of the traverse holder 25. Therefore, as the cam slider 44 moves, the T-boss 25a moves along the upper open groove 45a and then the aslant open groove 45c. Movement of the T-boss 25a causes the traverse holder 25 to move downward in the direction G1. As the result, traverse assembly 21 carrying the traverse holder 25 and the TAU 20 move downward.

As the TAU 20 moves downward and the drive motor 43 rotates as mentioned above, the cam slider 44 slides further in the direction E1. Thus the projecting boss 44b, which engages with the tray grooves 12 and 12 of the disc tray 10, also moves in the direction E1. Then, the projecting boss 44b moves to the longer part of the tray grooves 12 and 12 which assume a stepwise bent "L" shape. While the projecting boss 44b is moving, the disc tray 10 slightly moves in the direction H1 (toward the front side).

As the result, the tray rack 13 also moves in the direction H1 to engage with the gear tray 42. Engagement between the tray rack 13 and the gear tray 42 takes place simultaneously with disengagement between the cam slider 44 and the gear tray 42.

With engagement taking place between the tray rack 13 and the gear tray 42 as mentioned above, the tray rack 13 also moves in the direction H1 as the gear tray 42 rotates in the direction F1. In other words, the disc tray 10 moves toward the front side, thereby starting the operation of ejection.

As mentioned above, meshing between the tray rack 13 and the gear tray 42 causes the gear tray 42 to rotate in the direction F1 and the tray track 13 to move in the direction H1. In other words, the disc tray 10 moves toward the front side, thereby starting the process of ejection.

The disc drive unit 90 according to the present invention has only one drive motor 43 which performs as it rotates three actions—"action of OPU", "action of TAU", and "action of disc tray", as mentioned above. Moreover, the drive motor 43 has the strip plate 43c, which acquires by means of the transmitting sensor 27 the position detecting signals corresponding to the rotating position of the pinion gear 43b; therefore, it permits encoder control.

The foregoing is concerned with actions of "inward movement of OPU on the disc", "descent of TAU", and "ejection of disc tray". However, as the drive motor 43 is turned in the direction A2 (or reverse direction), the directions B2-H2 of rotation and movement are reversed to the directions B1-H1. Such reversal permits actions of "outward movement of OPU on the disc", "ascent of TAU", and "retracting of disc tray". In addition, the OPU 22 is locked as soon as it reaches the inside circumference of the disc and this locking remains while TAU 20 is ascending. On the other hand, locking is released as TAU 20 ascends and as soon as ascending is completed.

The encoder control mentioned above works as follows. If the user wants to play back a disc (such as DVD) using the disc drive unit 90, he places the disc in the disc drive unit 90. Before doing so, he pushes the open/close button on the external housing 11. The action of pushing the button issues control signals to eject the disc tray to the control unit 60 connected to the drive motor 43.

Upon receipt of the control signals, the control unit 60 applies a voltage of V0 (the first voltage) to the drive motor 43. Then the drive motor 43 moves the OPU 22 toward inside of the disc in response to the voltage V0. As soon as the OUP 22 reaches the inner periphery of the disc, the projection 31 c of the main rack 3 1a depresses the switch (SW) 28a of the contact sensor 28, thereby turning on the switch (SW-ON).

Upon receipt of the "ON" signal, the control unit 60 sets the voltage given by the driver circuit 88 at the second voltage V1 and turns the drive motor 43 as many times as the predefined number of slits (S1: predefined number of rotations). Thus it lowers the TAU 20 over a distance which is previously recognized according to the number of slits.

As the drive motor 43 turns as much as S1, the control unit 60 subsequently sets the voltage given by the driver circuit 88 at V2 (the third voltage) and turns the drive motor 43 as many times as the predefined number of slits (S2: predefined number of rotations). Thus, it ejects the disc tray 10 over a previously recognized distance according to the number of slits. However, it is desirable that the disc tray 10 be completely ejected and brought to rest slowly and smoothly. To meet this requirement, the control unit 60 according to the present invention gradually reduces the voltage V2 (0 V eventually) in the middle way and turns the drive motor 3 as many times as the predefined number of slits (S3: predefined number of rotations).

On the other hand, when the disc tray is to be retracted (or closed), the control unit 60 applies V3 (the fourth voltage), which is opposite to V1 and V2, thereby rotating the drive motor 43 as many times as the number of slits (S4: the predefined number of rotations) predefined in the driver circuit 88, and further rotates the drive motor 43 as many times as the predefined number of slits (S5: the predefined number of rotations). In this way the disc tray 10 is retracted.

Then, the control unit 60 sets the voltage given by the driver circuit 88 at V4 (the fifth voltage) and rotates the drive motor 43 until the switch 28a of the contact sensor 28 is turned off. In other words, it rotates the drive motor 43 until the TAU 20 continuously rises and locking of the OPU 22 is released. With locking released, the OPU 22 is ready to move outward. When the OFF reaction (or locking release signal) is received by the control unit, the drive motor 43 is brought to rest.

The drive motor 43, which ejects/retracts in the disc tray as mentioned above, corresponds to the loading motor 78. In this embodiment, the drive motor 43 performs "action of OPU", "action of TAU", and "action of disc tray". Needless to say, there may be exclusive motors for each of these actions, or there may be motors for each combination of these actions, or there may be motors which also function for other actions than mentioned above.

(3) Circuit to Detect the Counter Electromotive Force

Figure 10:
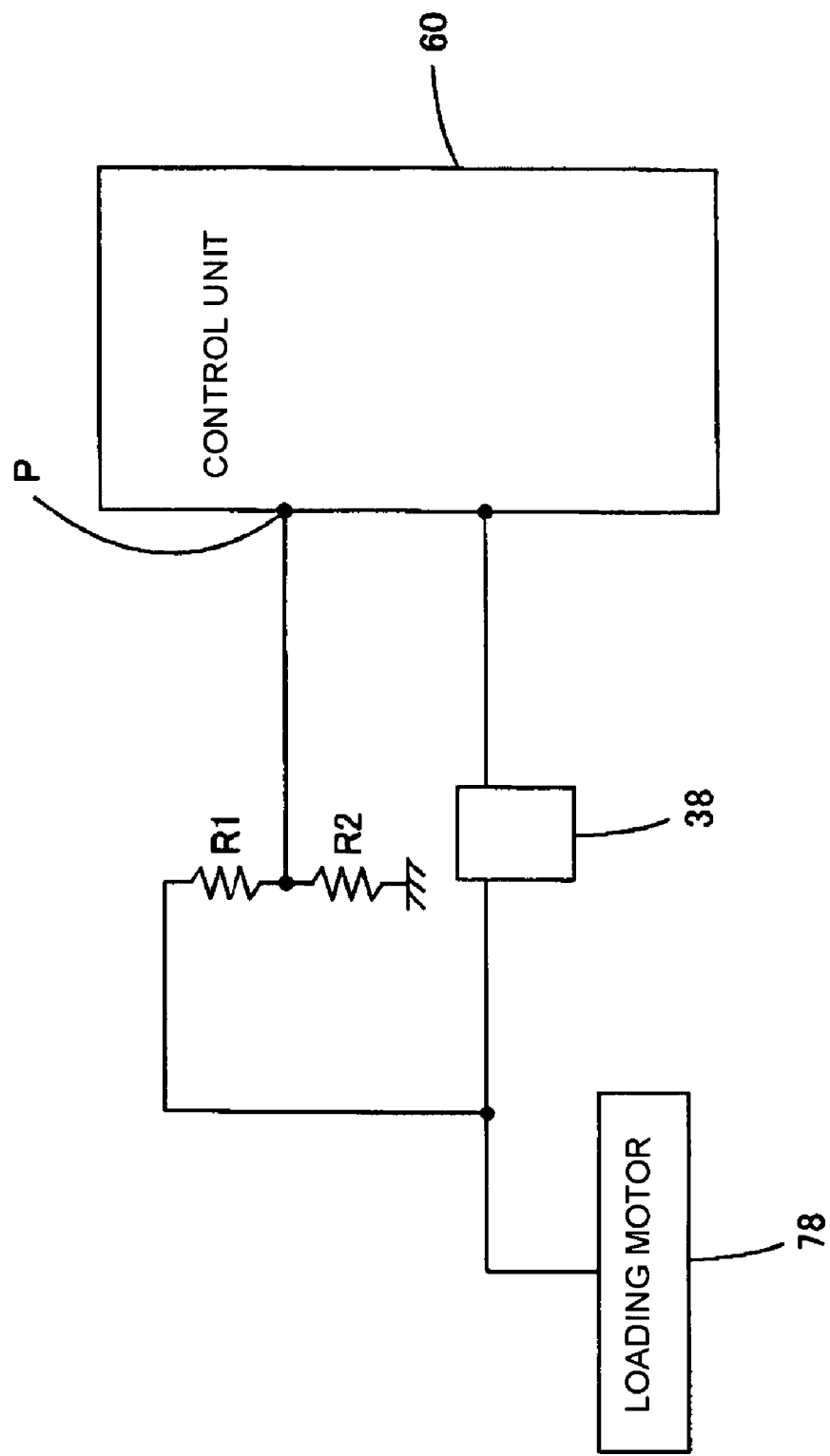
FIG. 10 is a circuit diagram showing the connection between the loading motor and the control unit.

Connection between the control unit 60 and the loading motor 78 is explained below. FIG. 10 is a circuit diagram showing connection between the loading motor 78 and the control unit 60.

The control unit 60 is connected to the driver circuit 88 through predefined terminals, and it delivers control signals, from these predefined terminals to the driver circuit 88, to instruct the direction and speed of rotation of the loading motor 78. The driver circuit 88 is connected to the terminals of the loading motor 78, and it generates drive voltage in response to the control signals of the control unit 60 and applies it to the terminals of the loading motor 78. The terminals of the loading motor 78 are also connected to the A/D input port P of the control unit 60 through a predefined voltage reducing circuit, so that the A/D input port P receives a voltage corresponding to the electromotive force generated by the loading motor 78.

The predefined voltage reducing circuit mentioned above has two resistors serially inserted between the voltage to be detected and the ground, so that the voltage at the connection between the two resistors is regarded as the new voltage to be detected. To be concrete, the terminal voltage of the loading motor 78 is connected to the ground through the serially connected resistors R1 and R2 and the voltage at the connecting point between these resistors R1 and R2 is connected to the A/D input port P. Because of this connection, the voltage applied to the A/D input port is limited to a certain portion of the voltage that appears at the terminal of the loading motor 78. For example, if V=0.7 V, this voltage is reduced to about 150 mV (a quarter of V) by R1 and R2, and the voltage at the connecting point between the resistors R1 and R2 is entered into the A/D input port P.

Under predefined conditions, the control unit 60 acquires the voltage applied to the A/D input port P and then judges whether or not the acquired voltage exceeds a predefined threshold value. This predefined threshold value for hand-close process is an average pressing force plus $4\sigma$, where $\sigma$ represents the standard deviation of the counter-electromotive force, assuming that the loading motor 78 generates an average counter-electromotive force of Ave (V) when the average pushing force of the disc tray 10 is X (N).

To be concrete, the disc tray 10, which has been ejected, is pushed inward so that the loading motor 78 generates the counter-electromotive force to be measured. This pushing force should be larger than the force due to vibration or smaller than the minimum force intentionally applied by the user. (Such vibration would occur when the user touches the disc tray or the DVD playback apparatus receives shocks from the moving parts therein, the desk, or the user's movement.) This counter-electromotive force is measured several times to obtain the average value Ave and standard deviation $\sigma$ of the counter-electromotive force. And, 130-150% of Ave+$4\sigma$ is regarded as the threshold value Ve.

The counter-electromotive force is actually measured in the following manner. (a) The disc unit 90 is mounted on a measuring apparatus, and the disc tray 10 is completely ejected. (b) A push-pull gage is fixed to an XZ stand. (c) The left end of the disc tray 10 is pushed by the push-pull gage and the resulting counter-electromotive force is measured by means of an oscilloscope.

Under other possible conditions, the disc tray 10 has been ejected outside from the disc unit 90, the disc tray 10 has been ejected from the disc unit 90 so that the user is ready to exchange the disc, or the disc tray is not being ejected. It is most desirable that the ejected disc tray 10 is completely ejected and at a standstill.

In the case where the disc tray 10 has been completely ejected and the disc tray 10 is movable only in the direction of retracting, the counter-electromotive force is defined in the following as the voltage which agrees in polarity with the voltage applied to the loading motor 78 when the disc tray 10 is ejected.

The predefined ratio is determined according to the specifications of the loading motor 78 and the control unit 60. That is, if the voltage that can be entered into the A/D input port of the control unit 60 is in the range of V1 to V2, then the voltage Ve as the threshold value mentioned above should be V1<Ve<V2 and Ve≅V1.

(4) Procedure by the Control Unit

Figure 11:
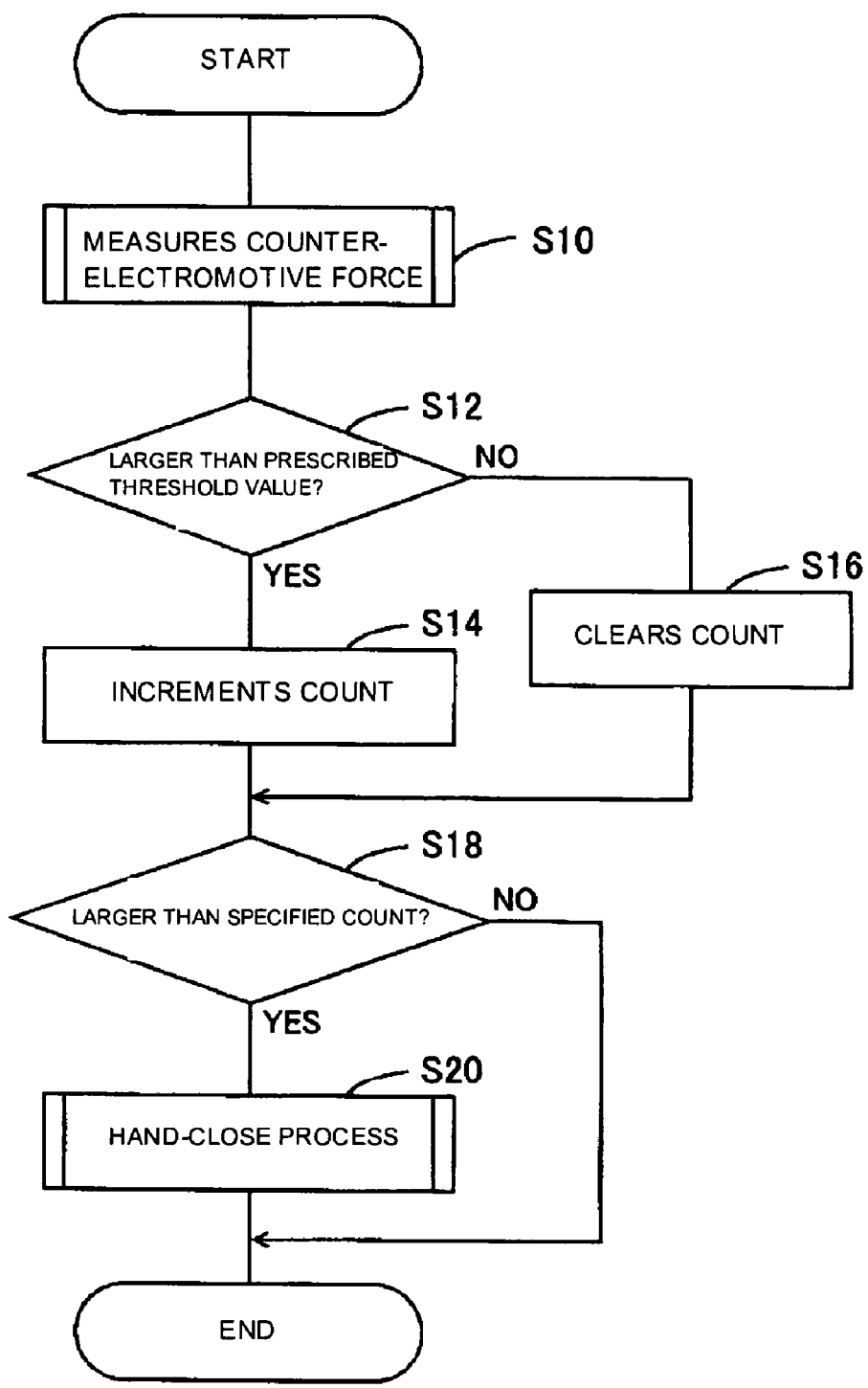
FIG. 11 is a flow chart showing a basic procedure in the control unit.

In the playback apparatus constructed as mentioned above, the control unit 60 controls the loading motor 78 according to the detected counter-electromotive force in the way shown in FIG. 11. FIG. 11 is a flow chart showing the procedure in the control unit 60. The control unit 60 follows this procedure at predefined time intervals when the above-specified conditions are satisfied. To be concrete, when the fact that the disc tray 10 has been completely ejected is detected, the procedure is implemented at intervals of 20 ms measured by the timer 60a in the control unit 60. If counter-electromotive force exceeding the predefined threshold value is measured consecutively more than 5 times, hand-close process is implemented.

After the hand-close process has started, the counter-electromotive force is measured in Step S10. To be concrete, the voltage applied to the A/D input port P is acquired.

In the subsequent Step S12, the voltage acquired in Step S10 is compared with a predefined threshold value. If the voltage that occurs in the loading motor 78 exceeds the threshold value Ve (conditions are satisfied), the procedure proceeds to Step S14. If the voltage that occurs in the loading motor 78 does not exceed the threshold value Ve (conditions are not satisfied), the procedure proceeds to Step S16. To be concrete, if the voltage in question exceeds Ve/4 applied to the A/D input port P (conditions are satisfied), the procedure proceeds to Step S14. If the voltage in question does not exceed Ve/4 applied to the A/D input port P (conditions are not satisfied), the procedure proceeds to Step S16.

If conditions are satisfied in Step S12, count is incremented in Step S14, and the procedure proceeds to Step S18. On the other hand, if conditions are not satisfied in Step S12, the procedure proceeds to Step S16, in which count is cleared, and the procedure proceeds to Step S18. That is, Steps S12, S14, and S16 execute the hand-close process only when the counter-electromotive force exceeds the predefined threshold value consecutively as many times as predefined.

Step S18 judges whether or not the count is 5 or more. In this embodiment, count 5 is the threshold value. Needless to say, this threshold value may be set arbitrarily. Taking count several times prevents the disc tray 10 from being retracted inadvertently when the user touches the disc tray 10 unintentionally and a voltage exceeding the predefined threshold value occurs or when a voltage exceeding the predefined threshold value occurs instantaneously due to noise.

Step S20 executes the hand-close process and completes the entire procedure. That is, it causes the driver circuit 88 to output control signals to supply a voltage that turns the loading motor 78 in the direction of retracting the disc tray 10 for a predefined period of time, so that the disc tray 10 is placed at a predefined position in the disc unit 90.

As mentioned above, the control unit 60, which executes Step S10, constitutes the unit for detecting counter-electromotive force, the control unit 60, which executes Steps S12 to S18, constitutes the unit for judging the counter-electromotive force, and the control unit 60, which executes Step S20, constitutes the unit for retracting the disc.

(5) Modified Procedure by the Control Unit

In the meantime, there may exist a case in which the voltage acquired by the control unit 60 does not exceed the predefined threshold value and hence the hand-close process does not start, if the tray is pushed in very slowly. For example, the user who is unfamiliar to the hand-close process would push the dray nervously. In this case the hand-close process does not start and the user would be embarrassed. The user in such a situation would think that the disc apparatus has no hand-close device.

Figure 12:
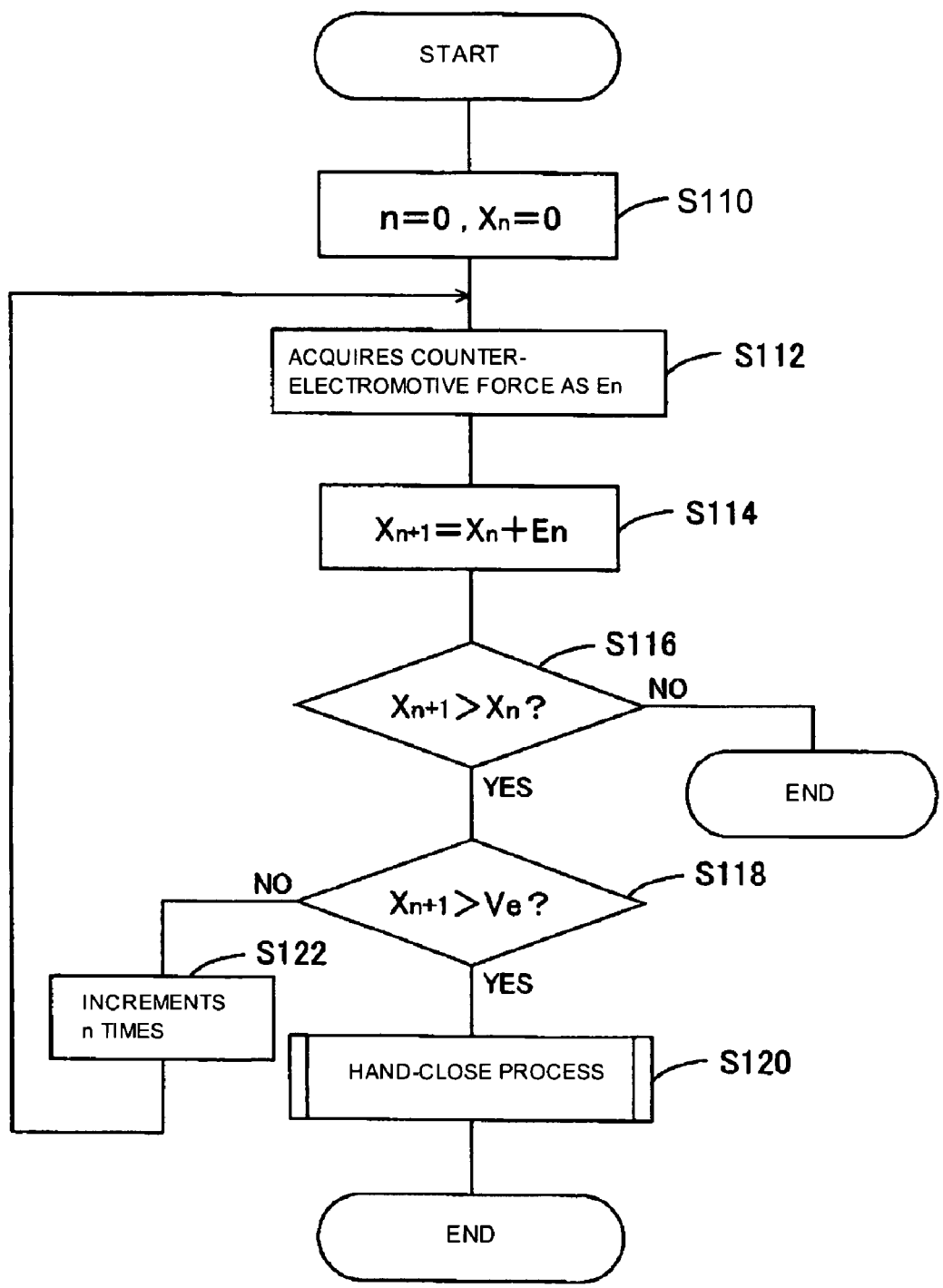
FIG. 12 is a flow chart showing a first modified procedure by the control unit.

A modified procedure to cope with such a situation consists of a step of summing the counter-electromotive force acquired by the control unit 60 and a step of starting the hand-close process when the summed counter-electromotive force exceeds a predefined value. The modified procedure is executed by the control unit 60 as explained below with reference to FIG. 12. FIG. 12 is a flow chart showing the modified procedure. This procedure starts, as in the above-mentioned embodiment, when predefined conditions are satisfied.

The procedure starts with Step S110, in which the control unit 60 resets n (count) and Xn (summed counter-electromotive force), where n represents the number of repetitions of Steps S112 to S118 (or how many times the counter-electromotive force is acquired for summation) after the start of the modified procedure.

In the subsequent Step S112, the control unit 60 acquires the voltage applied to the A/D input port P as En. For example, En is E0 when Step S112 is executed for the first time after the start of the procedure. The value of n increases one by one (1, 2, 3, . . . ) as the number of executions increases.

In Step S114, the control unit 60 sums the counter-electromotive force acquired. For example, when Step S114 is executed for the first time after the start of the procedure, X0 and E0 are entered into X1. (X0 is 0 because it has been reset in Step S110, and E0 is a value acquired in Step S112.) If Step S114 is executed after the start of the procedure, Xn should have a certain value, and increasing this value by addition of the newly acquired En gives the summed counter-electromotive force.

In Step S116, the control unit 60 judges whether or not Xn+1 is larger than Xn. Xn+1 should be larger than Xn because the counter-electromotive force principally takes on a positive value. Therefore, only when Xn+1=Xn, conditions are not satisfied. However, there may exist an instance in which the counter-electromotive force takes on a negative value due to noise and unintentional operation. In this case, too, conditions are not satisfied. When conditions are not satisfied, the procedure proceeds to Step S122, in which the control unit 60 increments the value of n and then repeats the steps that follow Step S112. On the other hand, if Xn+1 is larger than Xn, conditions are satisfied and the procedure proceeds to Step S120.

The procedure ends with Step S120, in which the control unit 60 executes the hand-close process. In other words, it delivers control signals to the driver circuit 88, thereby causing it to supply the loading motor 78 with a voltage sufficient for its rotation in the direction to retract the disc tray 10 for a predefined period of time. Thus, the disc tray 10 is retracted into a predefined position in the disc unit.

The modified procedure mentioned above consists of Step S112, in which the control unit 60 functions as a unit for detecting the counter-electromotive force, Steps S110, S114 to S118, and S122, in which the control unit 60 functions as a unit for judging the counter-electromotive force, and Step S120, in which the control unit 60 functions as a unit for retracting the disc.

(6) The Second Modified Procedure by the Control Unit

Figure 13:
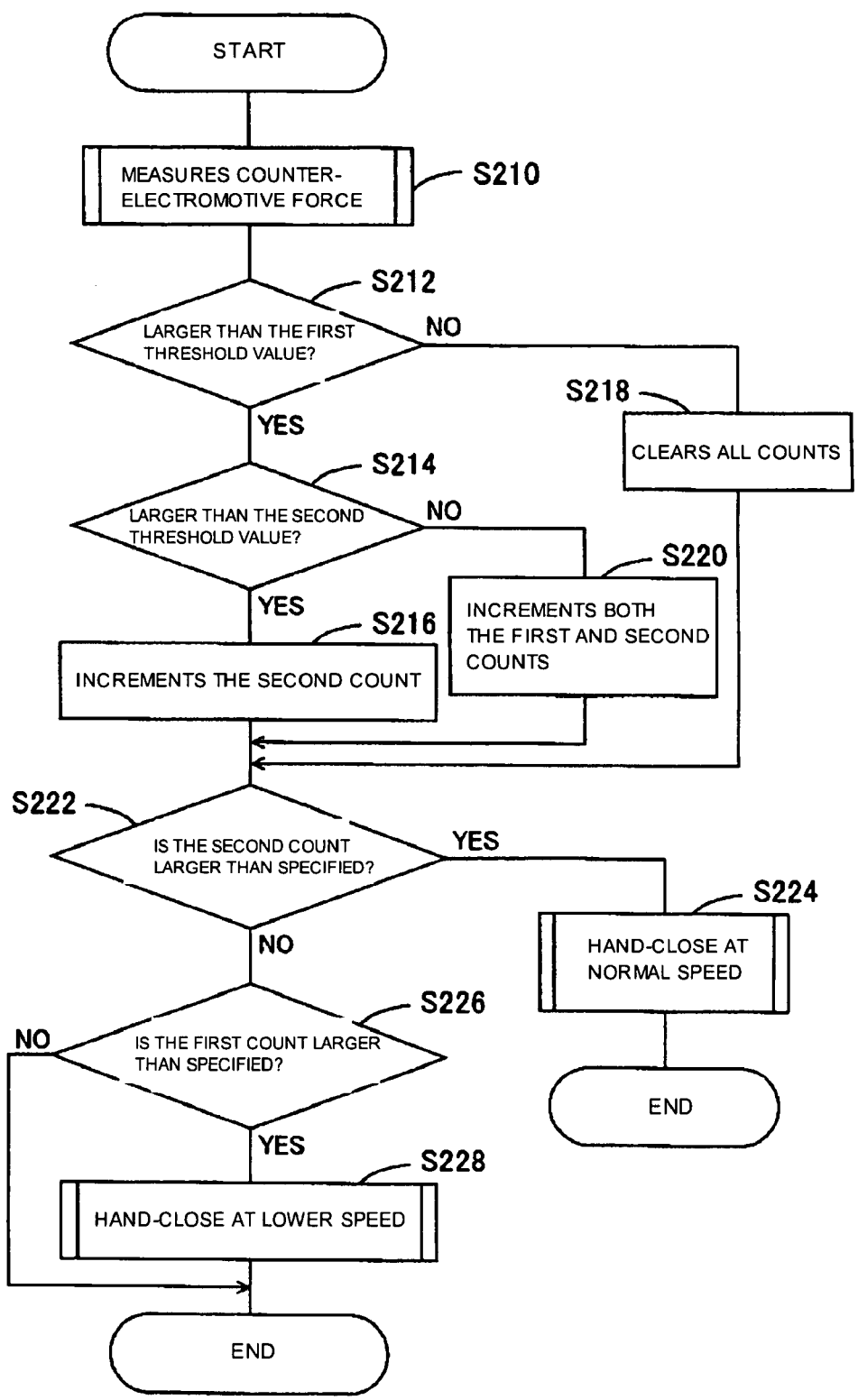
FIG. 13 is a flow chart showing a second modified procedure by the control unit.

The hand-close process may be adjusted to the user's experience if the disc tray is retracted at different speeds depending on whether the tray is pushed quickly or slowly. The second modified procedure to accomplish such hand-close process is explained below with reference to FIG. 13. FIG. 13 is a flow chart showing the second modified procedure by the control unit 60. As in the case of the above-mentioned embodiment, the second modified procedure starts when predefined conditions are satisfied.

After the hand-close process has started, the counter-electromotive force is measured in Step S210. To be concrete, the voltage applied to the A/D input port P is acquired.

In the subsequent Step S212, the control unit 60 judges whether or not the counter-electromotive force acquired in Step S210 is larger than the first threshold value Th1. If the counter-electromotive force is larger than the first threshold value Th1, it is considered that the conditions are satisfied, and the procedure proceeds to Step S214. On the other hand, if the counter-electromotive force is smaller than the first threshold value Th1, it is considered that the conditions are not satisfied, and the procedure proceeds to Step S218, in which both the first count and the second count are cleared, and the procedure proceeds to Step S222.

In Step S214, the control unit 60 judges whether or not the counter-electromotive force acquired in Step S210 is larger than the second threshold value Th2. If the counter-electromotive force is larger than the second threshold value Th2, it is considered that the conditions are satisfied, and the procedure proceeds to Step S216, in which the control unit 60 increments the second count only, and the procedure proceeds to Step S222. On the other hand, if the counter-electromotive force is smaller than the second threshold value Th2, it is considered that the conditions are not satisfied, and the procedure proceeds to Step S220, in which both the first count and the second count are incremented, and the procedure proceeds to Step S222.

Here, Th2>Th1. Also, any counter-electromotive force larger than Th1 and smaller than Th2 corresponds to the voltage which occurs when the disc tray is pushed in for hand close by the user with a force smaller than ordinary force. And, any counter-electromotive force larger than Th2 corresponds to the average force with which the user pushes in the disc tray for hand close. In other words, the predefined threshold value in the above-mentioned embodiment may be identical with the second threshold value Th2 in this second modified procedure.

In other words, the conditions are satisfied in Step S214 when the counter-electromotive force is larger than Th2 or when the user pushes in the disc tray with an ordinary force. And, the conditions are not satisfied in Step S214 when the counter-electromotive force is larger than Th1 and smaller than Th2 or when the user pushes in the disc tray slowly and nervously. Also, the conditions are not satisfied in Step S212 when the counter-electromotive force is smaller than Th1 or when the user does not push in the disc tray.

In Step S222, the control unit 60 judges whether the second count is larger than the specified count. If so, the conditions are satisfied and the procedure proceeds to Step S224 and the control unit 60 delivers control signals to the driver circuit 88 and the second modified procedure ends. The driver circuit 88 which has received control signals in Step S224 supplies the first voltage to the loading motor for a predefined period of time, so that the disc tray 10 is placed at a predefined position in the disc unit 90. On the other hand, if the second count is smaller than the specified count, and conditions are no satisfied and the procedure proceeds to Step S226.

In Step S226, the control unit 60 judges whether or not the first count is larger than the specified count. If the judgment is affirmative, the conditions are satisfied and the procedure proceeds to Step S228, in which the control unit 60 delivers control signals to the driver circuit 88, so that the second modified procedure ends. The driver circuit 88, which has received control signal in Step S228, supplies the third voltage, which is lower than the first voltage, to the loading motor for a predefined period of time, so that the disc tray is retracted more slowly than the rate at which the disc tray 10 has been retracted in Step S224. On the other hand, if the judgment is negative, the conditions are not satisfied and the second modified procedure ends.

In the second modified procedure mentioned above, the rotating speed of the loading motor, which is supplied with the third voltage in Step S226, corresponds to the first rotating speed, and the rotating speed of the loading motor, which is supplied with the first voltage in Step S224, corresponds to the second rotating speed. The second modified procedure mentioned above consists of Step S210, in which the control unit 60 functions as a unit for detecting the counter-electromotive force, Steps S212 to S222, and S226, in which the control unit 60 functions as a unit for judging the counter-electromotive force, and Steps S224 and S228, in which the control unit 60 functions as a unit for retracting the disc.

(7) The Third Modified Procedure by the Control Unit

Figure 14:
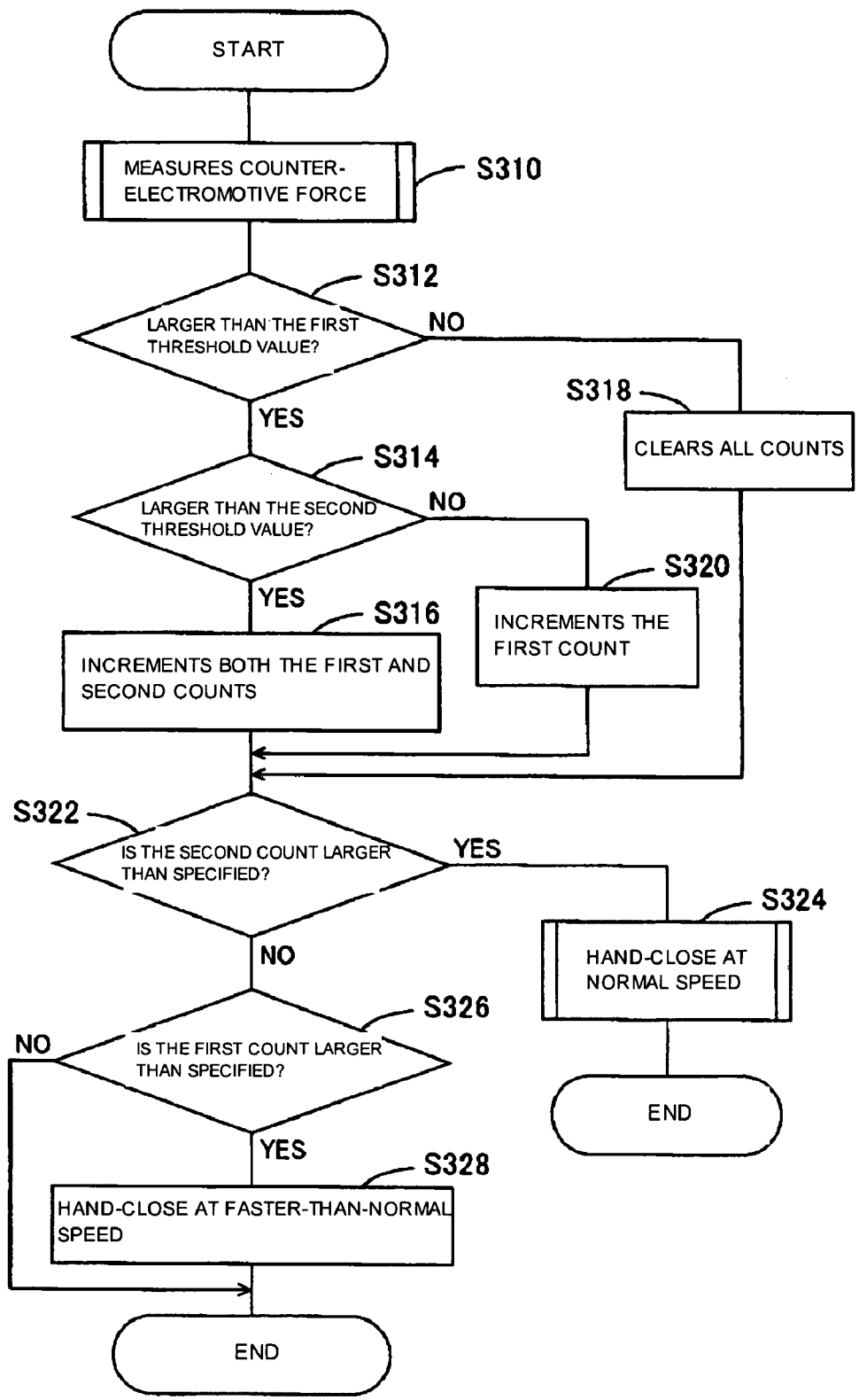
FIG. 14 is a flow chart showing a third modified procedure in the control unit.

The control unit 60 may be so constructed as to facilitate the hand-close process according to the user's skillfulness. The third modified procedure to accomplish such hand-close process is explained below with reference to FIG. 14. FIG. 14 is a flow chart showing the third modified procedure by the control unit 60. As in the case of the above-mentioned embodiment, the third modified procedure starts when predefined conditions are satisfied.

After the hand-close process has started, the counter-electromotive force is measured in Step S310. To be concrete, the voltage applied to the A/D input port P is acquired.

In the subsequent Step S312, the control unit 60 judges whether or not the counter-electromotive force acquired in Step S310 is larger than the first threshold value Th1. If the counter-electromotive force is larger than the first threshold value Th1, it is considered that the conditions are satisfied, and the procedure proceeds to Step S314. On the other hand, if the counter-electromotive force is smaller than the first threshold value Th1, it is considered that the conditions are not satisfied, and the procedure proceeds to Step S318, in which both the first count and the second count are cleared, and the procedure proceed to Step S322.

In Step S314, the control unit 60 judges whether or not the counter-electromotive force acquired in Step S310 is larger than the second threshold value Th2. If the counter-electromotive force is larger than the second threshold value Th2, it is considered that the conditions are satisfied, and the procedure proceeds to Step S316, in which the control unit 60 increments both the first count and the second count, and the procedure proceeds to Step S322. On the other hand, if the counter-electromotive force is smaller than the second threshold value Th2, it is considered that the conditions are not satisfied, and the procedure proceeds to Step S320, in which only the first count is incremented, and the procedure proceeds to Step S322.

Here, Th2>Th1, and the first and second threshold value in the third modified procedure are different from those threshold values in the second modified procedure mentioned above. Any counter-electromotive force larger than Th1 and smaller than Th2 corresponds to the average force with which the user pushes in the disc tray for hand close. And, any counter-electromotive force larger than Th2 corresponds to the voltage which occurs when the disc tray is pushed in for hand close by the user with a force smaller than ordinary force. In other words, the predefined threshold value in the above-mentioned embodiment may be identical with the first threshold value Th1 in this third modified procedure.

In other words, the conditions are satisfied in Step S314 when the counter-electromotive force is larger than Th2 or when the user pushes in the disc tray with a force larger than an ordinary one. And, the conditions are not satisfied in Step S314 when the counter-electromotive force is larger than Th1 and smaller than Th2 or when the user pushes in the disc tray with an ordinary force. Also, the conditions are not satisfied in Step S312 when the counter-electromotive force is smaller than Th1 or when the user does not push in the disc tray.

In Step S322, the control unit 60 judges whether the second count is larger than the specified count. If so, the conditions are satisfied and the procedure proceeds to Step S324 and the control unit 60 delivers control signals to the driver circuit 88 and the third modified procedure ends. The driver circuit 88 which has received control signals in Step S324 supplies the first voltage to the loading motor for a predefined period of time, so that the disc tray 10 is placed at a predefined position in the disc unit 90. On the other hand, if the second count is smaller than the specified count, and conditions are not satisfied and the procedure proceeds to Step S326.

In Step S326, the control unit 60 judges whether or not the first count is larger than the specified count. If the judgment is affirmative, the conditions are satisfied and the procedure proceeds to Step S328, in which the control unit 60 delivers control signals to the driver circuit 88, so that the third modified procedure ends. The driver circuit 88, which has received control signal in Step S328, supplies the fourth voltage, which is higher than the first voltage, to the loading motor for a predefined period of time, so that the disc tray is retracted more quickly than the rate at which the disc tray 10 has been retracted in Step S324. On the other hand, if the judgment is negative, the conditions are not satisfied and the third modified procedure ends.

In the third modified procedure mentioned above, the rotating speed of the loading motor, which is supplied with the first voltage in Step S324, corresponds to the first rotating speed, and the rotating speed of the loading motor, which is supplied with the fourth voltage in Step S326, corresponds to the second rotating speed. The third modified procedure mentioned above consists of Step S310, in which the control unit 60 functions as a unit for detecting the counter-electromotive force, Steps S312 to S322, and S326, in which the control unit 60 functions as a unit for judging the counter-electromotive force, and Steps S324 and S328, in which the control unit 60 functions as a unit for retracting the disc.

(8) Summary

In short, the control unit 60 has the A/D input port P which is given the voltage, which occurs at the terminal of the loading motor, after voltage reduction by the dividing resistors R1 and R2. It also acquires the voltage applied to the A/D input port P at intervals of 20 ms if the disc tray is in its completely ejected state and compares the acquired voltage with a predefined threshold value. If the acquired voltage is lower than the predefined threshold value, it clears the count, and if the acquired voltage is higher than the predefined value, it increments the count. If the count is larger than 5 times, the control unit 60 delivers control signals to the driver circuit 88, thereby driving the loading motor to retract the disc tray 10. In this way it is possible to provide a playback apparatus having a built-in disc drive capable of hand-close process without new addition of any expensive parts.

It goes without saying that the scope of the present invention is not limited to the above-mentioned embodiment. The present invention may be modified or changed by those skilled in the art as follows, for example.

The members and constitutions mentioned in the embodiment may be combined differently.

The members and constitutions mentioned in the embodiment may be partly substituted by known ones which are not disclosed in the embodiment.

The members and constitutions mentioned in the embodiment may be partly combined with any known ones which are not disclosed in the embodiment.

While the invention has been particularly shown and described with respect to preferred embodiments thereof, it should be understood by those skilled in the art that the foregoing and other changes in form and detail may be made therein without departing from the spirit and scope of the invention as defined in the appended claims.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

What is claimed is:

1. A playback apparatus capable of reading information recorded on a disc record medium, said playback apparatus having a disc tray on which a disc record medium is placed, a loading motor that ejects a disc record medium to a predefined position outside the playback apparatus and retracts a disc record medium into a predefined position inside the playback apparatus, a driver circuit capable of generating a first voltage to turn the loading motor in the direction of retracting the disc tray and a second voltage to turn the loading motor in the direction of ejecting the disc tray, and a control Integrated Circuit (IC) that control the driver circuit, the playback apparatus comprising:

said control IC has an Analog to Digital (A/D) input port that receives the terminal voltage of the loading motor after voltage reduction in a predefined ratio by dividing resistors, so that, when the disc tray is in completely ejected state, said control IC acquires the voltage applied to the A/D input port at predefined time intervals and compares the acquired voltage with the predefined threshold value, and said control IC clears the count if the acquired voltage is lower than the threshold value and said control IC increments the count if the acquired voltage is larger than the predefined threshold value, and then said control IC judges whether or not the count is larger than the predefined number of times, and said control IC outputs control signals to the driver circuit if the count is larger than the predefined number of times, thereby supplying the first voltage to the loading motor and causing the loading motor to retract the disc tray into the playback apparatus.

2. A playback apparatus capable of reading information recorded on a disc record medium, said playback apparatus having built therein a loading motor to eject the disc record medium to a predefined position outside the playback apparatus and retracts the disc record medium into a predefined position inside the playback apparatus, and also having a control Integrated Circuit (IC) that generates a first voltage to rotate the loading motor in the direction of retracting the disc record medium and that also generates a second voltage to rotate the loading motor in the direction of ejecting the disc record medium, the playback apparatus comprising:

said control IC has an Analog to Digital (A/D) input port;

a unit for detecting counter-electromotive force at the A/D input port, said counter-electromotive force having polarity opposite to that of the first voltage in the loading motor when the disc record medium is at the predefined position outside the apparatus, a unit for judging whether the counter-electromotive force exceeds a predefined threshold value; and a unit for retracting the disc record medium into the playback apparatus by controlling the loading motor when the unit for judging the counter-electromotive force judges that the counter-electromotive force has exceeded the predefined value.

3. The playback apparatus according to in claim 2, wherein the unit for judging the counter-electromotive force can use as the predefined threshold value a first threshold value and a second threshold value which is larger than the first threshold value, and the unit for retracting the disc record medium causes the loading motor to rotate at a first rotating speed when the counter-electromotive force is larger than the first threshold value and smaller than the second threshold value and also causes the loading motor to rotate at a second rotating speed, which is faster than the first rotating speed, when the counter-electromotive force is larger than the second threshold value.

4. The playback apparatus according to in claim 2, wherein the unit for judging the counter-electromotive force acquires and sums the counter-electromotive force at predefined time intervals and judges whether or not the summed value exceeds the predefined threshold value.

5. The playback apparatus according to in claim 2, wherein the unit for judging the counter-electromotive force acquires the counter-electromotive force at predefined time intervals and judges that the counter-electromotive force exceeds the predefined threshold value if the counter-electromotive force exceeds the predefined threshold value consecutively as many times as predefined.

* * * * *